United States Patent
Matsuoka et al.

(10) Patent No.: US 8,410,801 B2
(45) Date of Patent: Apr. 2, 2013

(54) PRESSURE DETECTION APPARATUS

(75) Inventors: Toshiyuki Matsuoka, Nagoya (JP); Yuzo Higuchi, Komaki (JP); Yoshinori Tsujimura, Kasugai (JP); Takio Kojima, Ichinomiya (JP)

(73) Assignee: NGK Spark Plug Co., LGD, Aichi (JP)

( * ) Notice: Subject to any disclaimer, the term of this patent is extended or adjusted under 35 U.S.C. 154(b) by 596 days.

(21) Appl. No.: 12/569,976

(22) Filed: Sep. 30, 2009

(65) Prior Publication Data
US 2010/0079155 A1   Apr. 1, 2010

(30) Foreign Application Priority Data

Sep. 30, 2008   (JP) .................................. 2008-252244
Sep. 17, 2009   (JP) .................................. 2009-215982

(51) Int. Cl.
    *G01R 27/08*   (2006.01)
(52) U.S. Cl. .............. 324/713; 73/708; 73/719; 73/720; 257/414
(58) Field of Classification Search .................... 324/713
    See application file for complete search history.

(56) References Cited

U.S. PATENT DOCUMENTS

| | | | | |
|---|---|---|---|---|
| 4,190,796 A | * | 2/1980 | Ishii | 323/280 |
| 4,320,664 A | * | 3/1982 | Rehn et al. | 73/708 |
| 4,480,478 A | * | 11/1984 | Sato et al. | 73/708 |
| 4,788,521 A | * | 11/1988 | Johnson | 338/3 |
| 4,813,272 A | * | 3/1989 | Miyazaki et al. | 73/708 |
| 5,187,985 A | * | 2/1993 | Nelson | 73/708 |
| 5,349,873 A | | 9/1994 | Omura et al. | |
| 5,412,992 A | * | 5/1995 | Tobita et al. | 73/721 |
| 5,635,649 A | * | 6/1997 | Tobita et al. | 73/717 |
| 5,773,728 A | | 6/1998 | Tsukada et al. | |
| 6,598,484 B2 | * | 7/2003 | Tanizawa | 73/754 |
| 6,889,554 B2 | * | 5/2005 | Hirota et al. | 73/719 |
| 2002/0053916 A1 | * | 5/2002 | Tanizawa | 324/713 |
| 2002/0190733 A1 | * | 12/2002 | Kinoshita et al. | 324/713 |
| 2003/0041670 A1 | * | 3/2003 | Hirota et al. | 73/720 |
| 2004/0169242 A1 | * | 9/2004 | Toyoda et al. | 257/414 |
| 2005/0103110 A1 | * | 5/2005 | Ernsberger et al. | 73/708 |
| 2007/0289370 A1 | * | 12/2007 | Hirose et al. | 73/116 |
| 2008/0163695 A1 | * | 7/2008 | Ichikawa | 73/721 |
| 2008/0289432 A1 | * | 11/2008 | Ohta et al. | 73/777 |

FOREIGN PATENT DOCUMENTS

| | | |
|---|---|---|
| JP | 6034455 A | 2/1994 |
| JP | 8271363 | 10/1996 |
| JP | 2002116105 A | 4/2002 |

* cited by examiner

*Primary Examiner* — Melissa Koval
*Assistant Examiner* — Benjamin M Baldridge
(74) *Attorney, Agent, or Firm* — Sughrue Mion, PLLC

(57) ABSTRACT

A pressure detection apparatus has a pressure-sensitive resistor whose first resistance varies according to pressure and a change of its own temperature, a temperature-sensitive resistor which has a same resistance-temperature coefficient as the pressure-sensitive resistor and whose second resistance varies according to the change of the temperature, a current source supplying first and second constant-currents to the pressure-sensitive and temperature-sensitive resistors respectively, and a pressure signal generation output section. The current source adjusts the first and second constant-currents so that when the pressure is an initial pressure, a reference first voltage appearing across the pressure-sensitive resistor and a reference second voltage appearing across the temperature-sensitive resistor become equal to each other. The pressure signal generation output section outputs a first voltage signal corresponding to the pressure on the basis of a difference voltage between a first voltage of the pressure-sensitive resistor and a second voltage of the temperature-sensitive resistor.

12 Claims, 13 Drawing Sheets

RELATIONSHIP BETWEEN TEMPERATURE AND DIFFERENCE VOLTAGE

RELATIONSHIP BETWEEN TEMPERATURE SENSOR SIGNAL AND AMPLIFICATION FACTOR

PRESSURE DETECTION APPARATUS

BACKGROUND OF THE INVENTION

The present invention relates to a pressure detection apparatus that is capable of detecting a pressure such as a cylinder internal pressure in an internal combustion engine, and more particularly to a pressure detection apparatus which has a pressure-sensitive resistor and a temperature-sensitive resistor and is capable of detecting the pressure correctly even if a temperature change occurs to the pressure-sensitive resistor.

In recent years, as a pressure detection apparatus that is capable of detecting a pressure such as a cylinder internal pressure in an internal combustion engine, there have been proposed and developed various pressure detection apparatuses having a Si device for detecting the pressure through a stress that occurs to the Si device itself according to the pressure by piezoresistive effect. For example, such pressure detection apparatuses have been disclosed in Japanese Patent Documents 1~3 (see the following Related Art Documents).

In Patent Document 1, a force transducer (pressure detection apparatus) has a plate-shaped Si device for detecting a pressure, which is an object of detection, a pressure transfer block (pressing member) which is bonded to one main surface of the Si device and transmits the pressure to this main surface, and a base (supporting member) which is bonded to the other main surface of the Si device and supports the Si device (see FIG. 1 and its description in Patent Document 1). On the one main surface of the Si device, straight-shaped four gages (pressure-sensitive resistors) whose resistances vary according to the pressure are formed. Two of these gages extend in <110> direction, and the other two gages extend in <100> direction, then a bridge is arranged by these four gages.

In Patent Document 2, a force transducer (pressure detection apparatus) has a plate-shaped Si device for detecting a pressure, which is an object of detection, a force transmission block (pressing member) which is joined with one main surface of the Si device and transmits the pressure to this main surface, and a support bed (supporting member) which is joined with the other main surface of the Si device and supports the Si device (see FIG. 1 and its description in Patent Document 2). In Patent Document 2, one pressure-sensitive resistor whose resistance varies according to the pressure is provided in the force transducer.

In Patent Document 3, a physical quantity detection device (pressure detection apparatus) has a diaphragm type Si device, and a center portion (diaphragm portion) of the Si device, which receives a pressure that is an object of detection, is formed thin (see FIG. 1 and its description in Patent Document 3). On a surface of the Si device, two sensing resistors (pressure-sensitive resistors) are formed. One of two resistors, i.e. a first sensing resistor, is placed so that its own resistance increases when the center portion of the Si device bends upon receiving the pressure. The other resistor, i.e. a second sensing resistor, is placed so that its own resistance decreases when the center portion of the Si device bends upon receiving the pressure. The physical quantity detection device has first and second constant-current sources which supply predetermined first and second constant currents to the sensing resistors respectively. Then, in the physical quantity detection device, the pressure is detected on the basis of a potential difference between an electric potential of a connection point that connects the first sensing resistor and the first constant-current source and an electric potential of a connection point that connects the second sensing resistor and the second constant-current source.

(Related Art Documents)
Patent Document 1: Japanese Patent No. 3317084
Patent Document 2: Japanese Patent No. 3166015
Patent Document 3: Japanese Patent Provisional Publication No. 2002-116105 (hereinafter is referred to as "JP2002-116105")

SUMMARY OF THE INVENTION

Such pressure detection apparatuses are used often for measurement of the cylinder internal pressure in the internal combustion engine. Nowadays, for a fine combustion control of the internal combustion engine, an attempt to use a glow plug, which becomes unnecessary after the preheating at an engine start, as the pressure detection apparatus is made. For this reason, it is desired that the pressure detection apparatus has a simple structure or configuration that easily allows miniaturization to be able to be built in the glow plug as well. Further, for the measurement of the cylinder internal pressure of the internal combustion engine, the pressure detection apparatus is also required to have high load-carrying capacity and high sensitivity.

The pressure detection apparatuses in Patent Documents 1, 2 are Si device-compression detection type apparatuses that have the plate-shaped Si device and detect the compression of the Si device which occurs by the pressure that is the detection target. On the other hand, the physical quantity detection device in Patent Document 3 is a diaphragm-bending detection type apparatus that has the diaphragm type Si device and detects the bend of the diaphragm portion which occurs by the pressure that is the detection target.

In the diaphragm type Si device, not only a compressive stress but also a tensile stress arise, thus the load-carrying capacity is low. On the other hand, in the compression type Si device, since the stress required for the detection is only the compressive stress, the load-carrying capacity is high. In a case where a high pressure (e.g. approx. 20 MPa) such as the cylinder internal pressure in the internal combustion engine is applied and also high safety is required as a use in a vehicle, the diaphragm type Si device is inadequate or unsuitable for use in such condition. The use of the compression type Si device is favorable to such condition. In addition, the diaphragm type Si device is difficult to be miniaturized, and tends to become large (e.g. outside diameter is approximately 6.5 mm). On the other hand, the compression type Si device meets the miniaturization (e.g. approx. □2.0 mm), and can gain an adequate sensitivity. As a consequence, to satisfy the load-carrying capacity, the miniaturization (size reduction) and the sensitivity at the same time, the compression type Si device is favorable.

The force transducer (pressure detection apparatus) in Patent Document 1 is easy to be miniaturized, because the type Si device is the compression type, as explained above. However, since as many as four gages (pressure-sensitive resistors) are provided on the main surface of the Si device, this interferes with the miniaturization. Furthermore, if the number of gages (pressure-sensitive resistors) is large, the number of wires which connect to the Si device (the number of output wires) also becomes large. This also interferes with the miniaturization of the force transducer. Additionally, this force transducer (pressure detection apparatus) has no temperature-sensitive resistor for detecting a temperature of the Si device. Thus the temperature of the Si device cannot be detected.

On the other hand, in the case of the force transducer (pressure detection apparatus) in Patent Document 2, because of the compression type, the Si device is easy to be miniaturized, and besides, since only one pressure-sensitive resistor is provided, this is also advantageous to the miniaturization. Moreover, since it is possible to reduce the number of wires which connect to the Si device, the Si device is easy to be miniaturized. Here, regarding the pressure-sensitive resistor, its resistance varies according to not only an applied pressure, but the resistance greatly varies according to its own temperature (temperature of the Si device) as well. Therefore, there is a need to perform temperature characteristic compensation. However, in the force transducer in Patent Document 2, since only one pressure-sensitive resistor is present in the device and the temperature-sensitive resistor for detecting the temperature of the device (pressure-sensitive resistor) is not provided, the temperature of the device (pressure-sensitive resistor) cannot be detected, and it is thus difficult to perform this temperature characteristic compensation. Hence, when using this force transducer under a condition in which temperature change is great, such as in the internal combustion engine, it is difficult to accurately detect the pressure that is the object of detection.

In contrast, in the physical quantity detection device (pressure detection apparatus) in Patent Document 3, the number of sensing resistors (pressure-sensitive resistors) formed on the surface of the Si device is two. Thus, as far as this point is concerned, as compared with the force transducer having the four pressure-sensitive resistors in Patent Document 1, the Si device is easy to be miniaturized. Further, as mentioned above, by detecting the pressure on the basis of the potential difference between the electric potential of the connection point that connects the first sensing resistor and the first constant-current source and the electric potential of the connection point that connects the second sensing resistor and the second constant-current source, variation of each resistor, caused by difference of the temperature, can be cancelled or compensated. Consequently, the pressure of the detection target can be detected more accurately than the force transducer (pressure detection apparatus) in Patent Document 2.

However, in the physical quantity detection device in Patent Document 3, even if there is no difference of impurity concentration between both the two sensing resistors, when a production error (production error for each product) occurs in a target value (target dose) of the impurity concentration, an error occurs in an effect of temperature-sensitivity compensation of piezoresistive by constant-current drive, then a temperature-sensitivity characteristic arises. More specifically, for example, when p-type impurity concentration is $1 \times 10^{20}/cm^3$, for instance, a resistance-temperature coefficient TCR is approximately 1600 ppm, and a temperature-sensitivity characteristic TCS is approximately −1600 ppm. Since TCR+TCS is almost zero, the temperature-sensitivity characteristic is diminished by the effect of the temperature-sensitivity compensation. However, for example, when p-type impurity concentration becomes $0.8 \times 10^{20}/cm^3$ due to the production error for each product, for instance, the resistance-temperature coefficient TCR is approximately 1400 ppm, and the temperature-sensitivity characteristic TCS is approximately −1800 ppm. In this case, since TCR+TCS does not become zero, the effect of the temperature-sensitivity compensation is reduced. Because of this, the pressure of the detection target cannot be detected with high accuracy.

To compensate for this, in general, a circuit for automatically adjusting an amplification factor on the basis of a temperature sensor signal could be installed. However, if the temperature sensor is provided in the Si device in Patent Document 3, this results in increase in the number of wires. On the other hand, if the temperature sensor is provided on a circuit board, since a difference of the temperatures between the Si device provided with the sensing resistors and the circuit board arises, high accurate compensation cannot be performed. In addition, when taking an average of voltages that appear across the two sensing resistors, it becomes the temperature signal in theory. However, also in this case, due to an effect of the production variations (variations in bending amount), the temperature signal cannot be detected with high accuracy. As explained above, in the physical quantity detection device in Patent Document 3, the pressure of the detection target cannot be detected with high accuracy.

In addition, as described above, in the physical quantity detection device in Patent Document 3, the type Si device is the diaphragm type, while in the pressure detection apparatuses in Patent Documents 1, 2, the type Si devices are the compression type. Because of this, even if the two sensing resistors like the Patent Document 3 are provided in this compression type Si device, the pressure detection apparatus cannot have a configuration in which the resistance of the one sensing resistor increases and the resistance of the other sensing resistor decreases for the pressure. That is, in this case, both resistances of the two sensing resistors increase for the pressure. Therefore, when determining a difference voltage as mentioned above, not only the resistance change occurring according to the temperature but also the resistance change occurring according to the pressure of the detection target are cancelled. As a result, it is not possible to accurately detect the pressure.

It is therefore an object of the present invention to provide a pressure detection apparatus which has a pressure-sensitive resistor and is capable of accurately detecting a pressure, which is an object of detection, by properly cancelling the resistance change of this pressure-sensitive resistor, caused by the temperature change.

According to one aspect of the present invention, a pressure detection apparatus comprises: a pressure-sensitive resistor whose first resistance r1 varies according to a change of a pressure P, which is an object of detection, and a change of a temperature T of the pressure-sensitive resistor itself; a temperature-sensitive resistor which has a same resistance-temperature coefficient as the pressure-sensitive resistor and whose second resistance r2 varies according to the change of the temperature T; a current source for supplying a current to the pressure-sensitive resistor and the temperature-sensitive resistor, the current source having a first constant-current source that supplies a predetermined first constant-current i1 to the pressure-sensitive resistor, and a second constant-current source that supplies a predetermined second constant-current i2 to the temperature-sensitive resistor, and the current source adjusting magnitudes of the predetermined first constant-current i1 and the predetermined second constant-current i2 so that when the pressure P is an initial pressure $P_o$, a reference first voltage Vpo that appears across the pressure-sensitive resistor and a reference second voltage Vto that appears across the temperature-sensitive resistor become equal to each other; and a pressure signal generation output section which generates and outputs a first voltage signal Spp corresponding to the pressure P on the basis of a difference voltage (Vp−Vt) between a first voltage Vp that appears across the pressure-sensitive resistor in accordance with the pressure P and a second voltage Vt that appears across the temperature-sensitive resistor.

The other objects and features of this invention will become understood from the following description with reference to the accompanying drawings.

DETAILED DESCRIPTION OF THE INVENTION

An embodiment of a pressure detection apparatus will be explained below with reference to the drawings.

Figure 1:
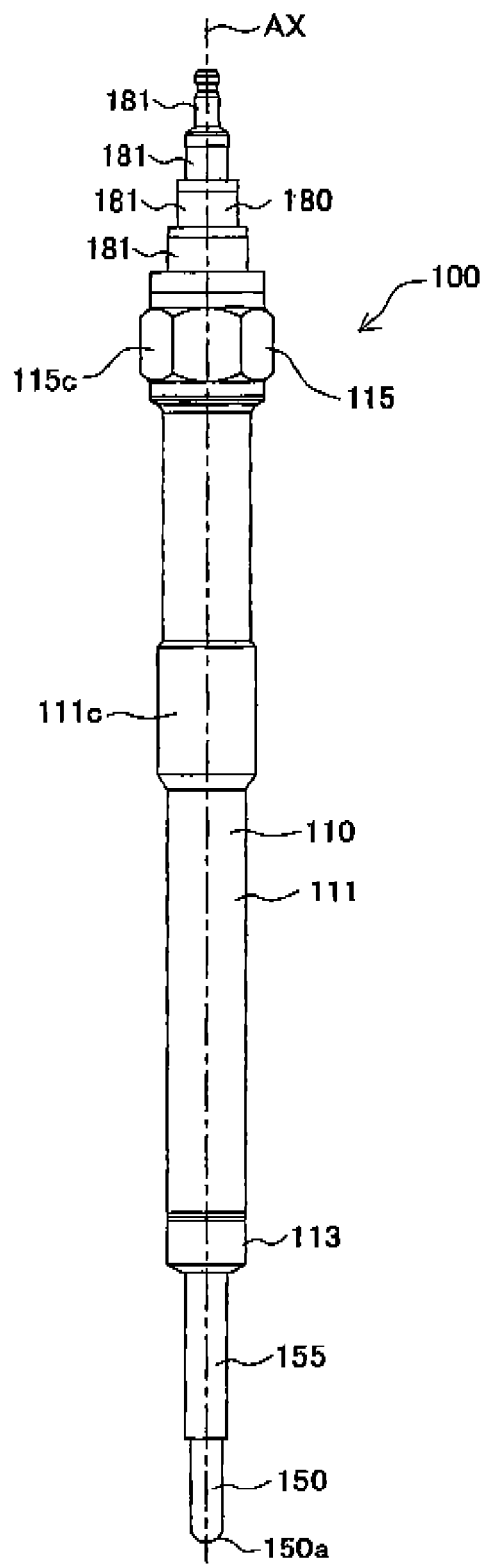
FIG. 1 is an outward appearance of a glow plug with cylinder internal pressure sensor of a present embodiment.

FIG. 1 shows an outward appearance of a glow plug with cylinder internal pressure sensor (pressure detection apparatus) 100 of the present embodiment. FIGS. 2 to 5 show longitudinal cross sections of the glow plug with cylinder internal pressure sensor 100. In FIGS. 1 to 5, a lower side of the glow plug 100 is termed an axis AX direction top end side (hereinafter simply called the top end side), and an upper side of the glow plug 100 is termed an axis AX direction base end side (hereinafter simply called the base end side).

Figure 2:
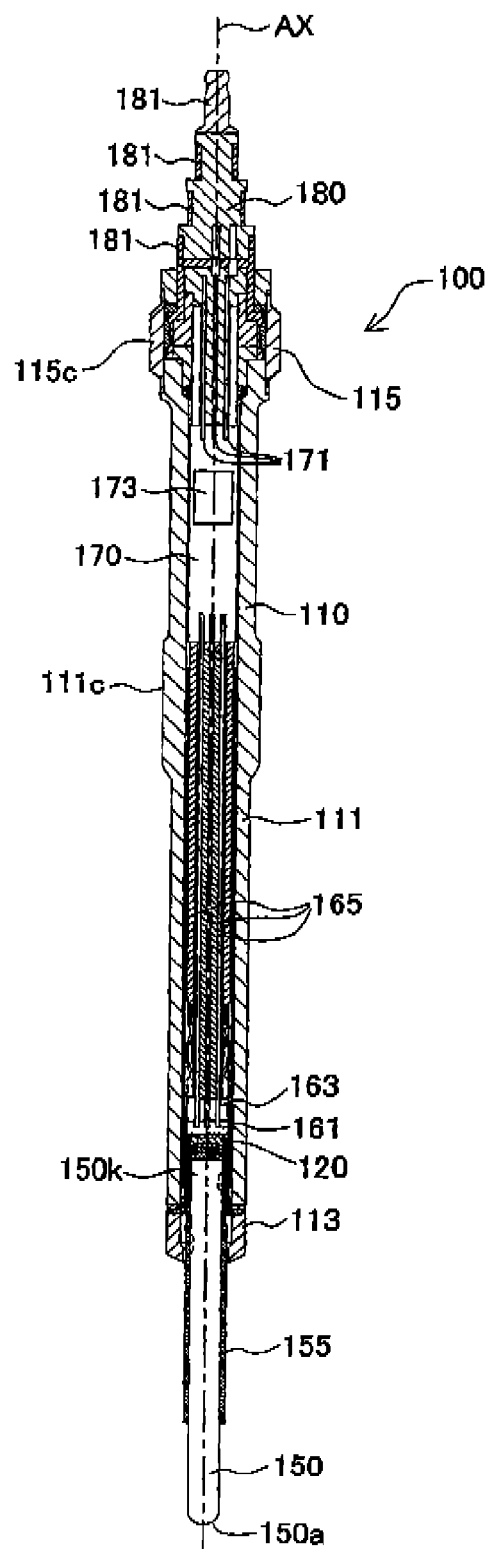
FIG. 2 is a sectional view of the glow plug with cylinder internal pressure sensor.
Figure 3:
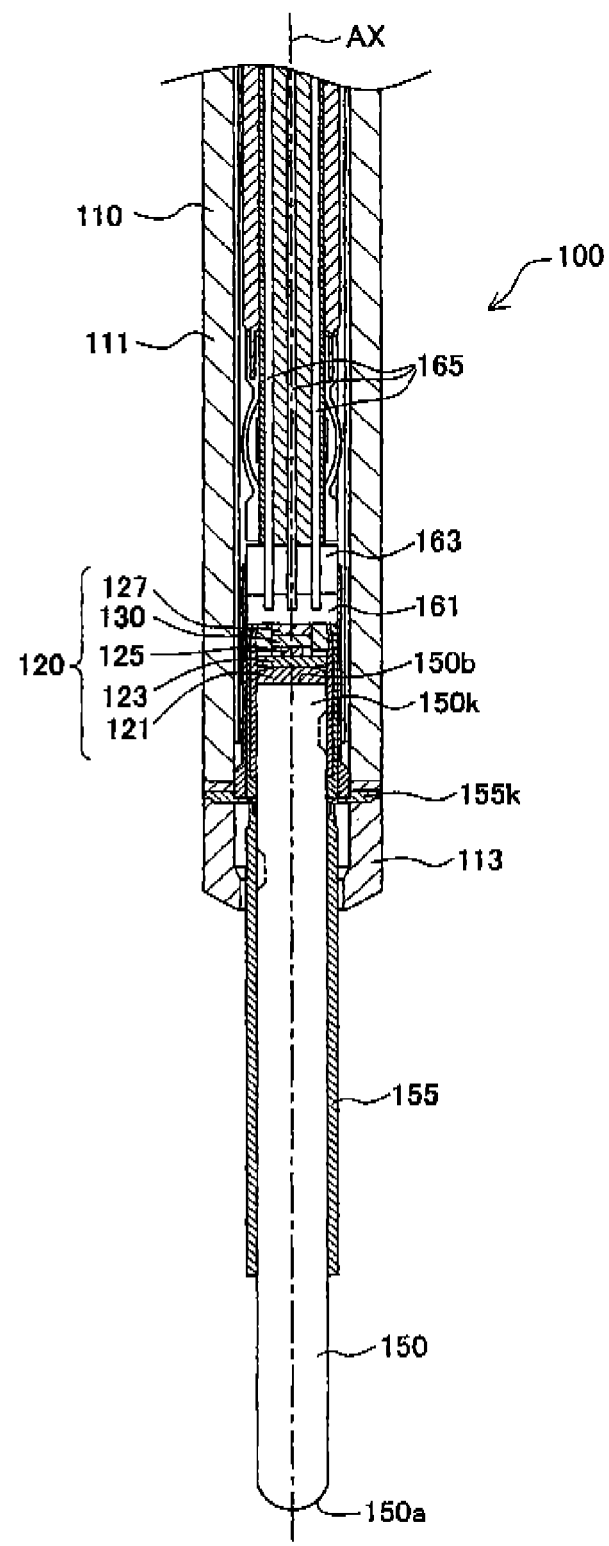
FIG. 3 is a sectional view showing a top end side of the glow plug with cylinder internal pressure sensor.

The glow plug with cylinder internal pressure sensor 100 has not only a function as the glow plug but also a function of detecting a pressure (a cylinder internal pressure) P. In addition, this glow plug with cylinder internal pressure sensor 100 also has a function of detecting a temperature T of a Si (silicon) device (or element) 130 (more specifically, a temperature T of an after-mentioned pressure-sensitive resistor 131 formed on this Si device 130) that is built in the glow plug 100. As shown in FIGS. 1 to 3, the glow plug with cylinder internal pressure sensor 100 has a tubular housing 110 that extends in the axis AX direction, a pressure detecting system 120 and a wiring board (or circuit board) 170 which are housed inside the housing 110, a heater 150 that protrudes from the housing 110 toward the top end side, an external terminal portion 180 that protrudes from the housing 110 toward the base end side, and so on.

The housing 110 is made of metal (e.g. carbon steel). The housing 110 has a housing body 111 extending in the axis AX direction, a top end side housing portion 113 fixed to a top end side of the housing body 111, and a base end side housing portion 115 fixed to a base end side of the housing body 111.

The housing body 111 has large length in the axis AX direction, thus most of the housing 110 is formed by this housing body 111. Inside the housing body 111, after-mentioned pressure detecting system 120 and circuit board 170 etc. are housed. In the present embodiment, an inside diameter of a part of the housing body 111, where the pressure detecting system 120 and the circuit board 170 are positioned, is φ5.35 mm. And as can be seen in FIGS. 1 and 2, a screw portion 111c is provided in a certain position on an outer circumference of the housing body 111, located at almost central portion in the axis AX direction of the housing body 111, so as to secure the glow plug with cylinder internal pressure sensor 100 to an internal combustion engine (diesel engine) (not shown). In the present embodiment, a screw diameter of this screw portion 111c is M10, but it could be M8. Here, in FIGS. 1, 2 and 4, a screw thread of the screw portion 111c is omitted.

As seen in the drawings, an after-mentioned base end side portion of the heater 150 is inserted into the top end side housing portion 113. On the other hand, a tool engagement portion 115c is provided on an outer circumference of the base end side housing portion 115. A cross-sectional profile of this tool engagement portion 115c is hexagon for fitting a tool such as a ratchet wrench. Then, by tightening the tool engagement portion 115c with the ratchet wrench, the glow plug 100 is screwed through the screw portion 111c and secured to the internal combustion engine. Further, an after-mentioned top end side portion of the external terminal portion 180 is inserted into the base end side housing portion 115, and wiring (wires) 171, 171, . . . etc. pass through the base end side housing portion 115.

Figure 5:
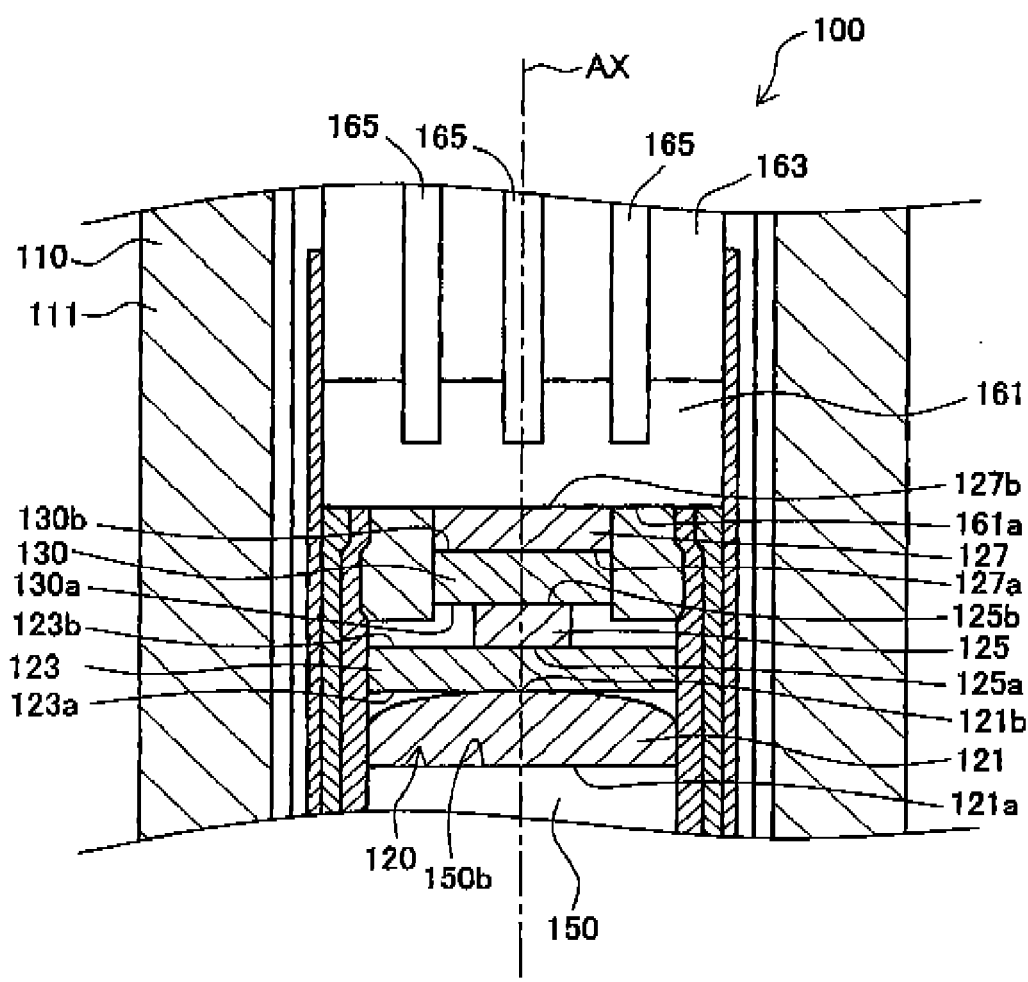
FIG. 5 is a locally enlarged sectional view showing a pressure detecting system and its surrounding components, of the glow plug with cylinder internal pressure sensor.

The pressure detecting system 120 built inside the housing body 111 has a top end member 121, an intermediate member 123, a pressing member 125, the Si device 130, and a supporting member 127, then these are placed in this order from top end side toward base end side (see FIGS. 3 and 5).

The top end member 121 is made of metal (e.g. SUS430, SUJ), and has a top end surface 121a and a base end surface 121b. The top end surface 121a is a plane surface (more specifically, a circular plane surface), and touches or is contiguous with an after-mentioned base end surface 150b of the heater 150. On the other hand, as for the base end surface 121b, its center swells up, and the base end surface 121b has a rounded surface. That is, the base end surface 121b has a domed shape. A top portion of the base end surface 121b (i.e. the swelling center of the base end surface 121b) touches or is contiguous with a top end surface 123a (described next) of the intermediate member 123.

The intermediate member 123 is made of metal (e.g. SUS430), and is formed into a plate (disc-shaped plate). The intermediate member 123 has the top end surface 123a and a base end surface 123b that is parallel to the top end surface 123a. As described above, the top end surface 123a touches or is contiguous with the base end surface 121b of the top end member 121. On the other hand, the base end surface 123b touches or is contiguous with a top end surface 125a (described next) of the pressing member 125.

The pressing member 125 is made of glass, and has the top end surface 125a and a base end surface 125b that is parallel to the top end surface 125a. The pressing member 125 is cylindrical in shape, whose diameter is smaller than that of the intermediate member 123. As explained above, the top end surface 125a touches or is contiguous with the base end surface 123b of the intermediate member 123. On the other hand, the base end surface 125b touches or is contiguous with a first main surface 130a (described next) of the Si device 130, which is a top end surface of the Si device 130. More specifically, these base end surface 125b of the pressing member 125 and first main surface 130a of the Si device 130 are fixed to each other with the both surfaces 125b and 130a being contiguous.

The Si device 130 has the first main surface 130a, which is the top end surface of the Si device 130, and a second main surface 130b, which is a base end surface of the Si device 130 and is parallel to the first main surface 130a. The Si device 130 has a plate shape (rectangular plate shape), and its size is □1.5 mm~□2.5 mm (in the present embodiment, □2.0 mm). As mentioned above, the first main surface 130a touches or is contiguous with the base end surface 125b of the pressing member 125. On the other hand, the second main surface 130b touches or is contiguous with a top end surface 127a (described next) of the supporting member 127. More specifically, these second main surface 130b of the Si device 130 and top end surface 127a of the supporting member 127 are fixed to each other with the both surfaces 130b and 127a being contiguous. As described above, since the Si device 130 is also fixed to the pressing member 125, these pressing member 125, Si device 130 and supporting member 127 are fixedly connected with each other. With regard to the Si device 130, its detailed arrangement or configuration will be explained later.

The supporting member 127 is made of glass, and has a plate shape (rectangular plate shape). The supporting member 127 has the top end surface 127a and a base end surface 127b that is parallel to the top end surface 127a. As mentioned above, the top end surface 127a touches or is contiguous with the second main surface 130b of the Si device 130, then the top end surface 127a of the supporting member 127 supports or holds the Si device 130 from the base end side of the Si device 130. On the other hand, the base end surface 127b touches or is contiguous with an after-mentioned top end surface 161a of a base or seat 161.

In the pressure detecting system 120 having such configuration, when a top end surface 150a of the heater 150 receives the pressure (cylinder internal pressure) P in the base end side direction, the base end surface 150b of the heater 150 presses the pressure detecting system 120 toward the base end side, then the pressure detecting system 120 is pressed or compressed between the seat 161 and the heater 150. With this compression, the cylinder internal pressure P is detected. More specifically, the base end surface 150b of the heater 150 presses the top end member 121 of the pressure detecting system 120 toward the base end side. The top end member 121 presses the intermediate member 123 toward the base end side, and the intermediate member 123 presses the pressing member 125 toward the base end side. Further, the pressing member 125 presses the Si device 130 toward the base end side. On the other hand, since a position in the axis AX direction of the supporting member 127 is restricted on its base end side by the seat 161, the Si device 130 is compressed in the axis AX direction between the pressing member 125 and the supporting member 127 by a pressing force according to the pressure P from the pressing member 125. With this compression, resistance of the pressure-sensitive resistor 131 (described later) etc., which are formed on the Si device 130, change to values corresponding to the cylinder internal pressure P by piezoresistive effect, thereby detecting the cylinder internal pressure P which the heater 150 receives.

Next, a top end side structure of the glow plug with cylinder internal pressure sensor 100, which is located on the top end side of the pressure detecting system 120, will be explained (see FIGS. 2 and 3). As can be seen in the drawings, the heater 150 that serves as a heating element (or heat generator) of the glow plug is provided on the top end side of the pressure detecting system 120. The heater 150 has a stick or rod shape (more specifically, cylindrical column), and its top end surface 150a is a hemispherical surface, while the base end surface 150b is a plane surface.

The heater 150 is inserted into the top end side housing portion 113. Furthermore, a base end portion 150k of the heater 150 is inserted into the housing body 111. Then the base end surface 150b of this heater 150 touches or is contiguous with the pressure detecting system 120 (the top end surface 121a of the top end member 121). On the other hand, a top end side portion of the heater 150 protrudes from the housing 110 toward the top end side.

An outer cylinder or cylindrical-shaped outer casing 155 is provided on outer circumference of a middle section in the axis AX direction of the heater 150. A base end side portion of the outer cylinder 155 is inserted into the top end side housing portion 113, while a top end side portion of the outer cylinder 155 protrudes from the housing 110 toward the top end side. A base end portion 155k of the outer cylinder 155 is formed into a flange, and is secured between the housing body 111 and the top end side housing portion 113 through welding with the base end portion 155k sandwiched and supported between the housing body 111 and the top end side housing portion 113.

Figure 4:
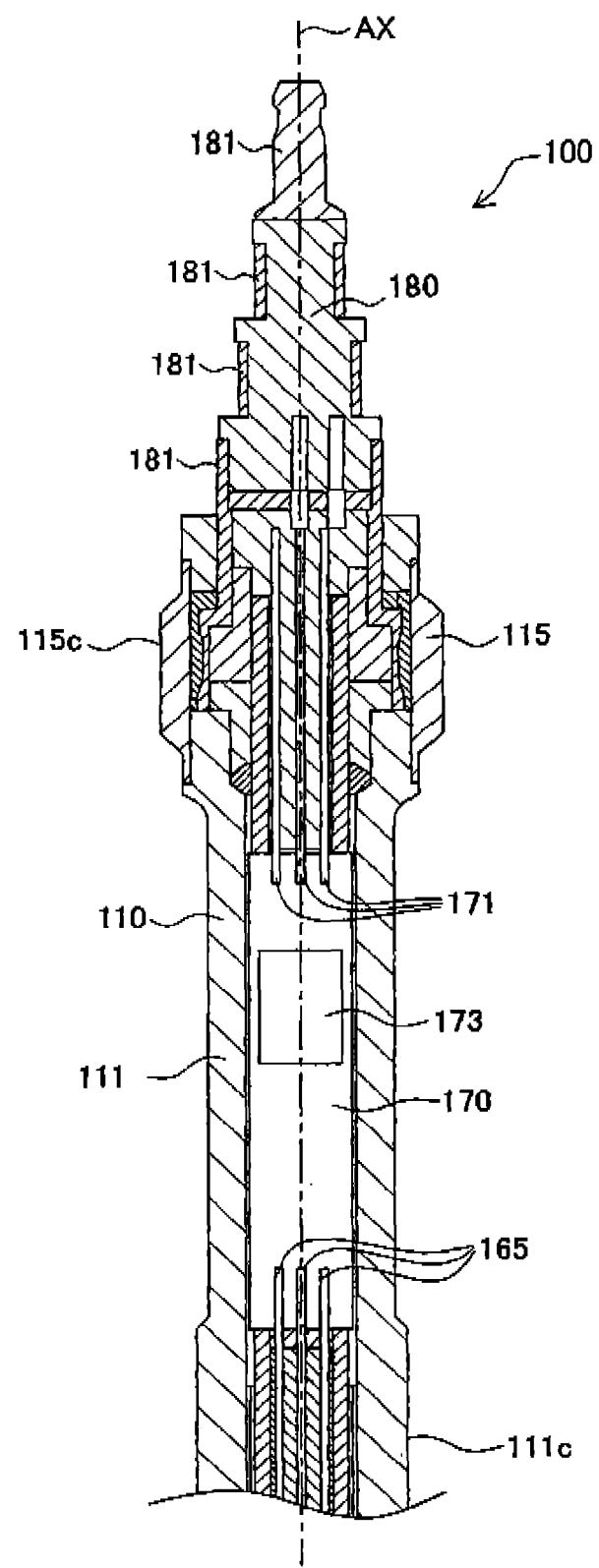
FIG. 4 is a sectional view showing a base end side of the glow plug with cylinder internal pressure sensor.

Next, a structure of the glow plug with cylinder internal pressure sensor 100, which is located on the base end side of the pressure detecting system 120, will be explained (see FIGS. 2 to 4). As can be seen in the drawings, the seat 161 is provided on the base end side of the pressure detecting system 120. In addition, a seat retainer 163 is provided on a base end side of the seat 161. The seat retainer 163 serves to fix or retain a position in the axis AX direction of the seat 161 on the base end side of the seat 161.

Moreover, three wires 165, 165, 165 are connected to the pressure detecting system 120. Each of these wires 165, 165, 155 extends from the pressure detecting system 120 toward the base end side and is connected to the wiring board (or circuit board) 170. Further, another wire (not shown) is connected to the heater 150, and extends toward the base end side and is connected to the circuit board 170.

The circuit board 170 is housed inside the housing body 111 of the housing 110. The circuit board 170 is provided with an electronic circuit 173 for processing an output signal from the pressure detecting system 120 (the Si device 130). As explained above, the wires 165 extending from the pressure detecting system 120 and the heater 150 are connected with the circuit board 170 on the top end side, while four wires 171, 171, 171 . . . (one of four wires is not shown) are connected with the circuit board 170 on the base end side. These wires 171, 171 . . . extend toward the base end side, and are connected to the external terminal portion 180.

The external terminal portion 180 positioned on the base end side of the housing 110, has four terminals 181, 181, 181, 181. The wires 171, 171 . . . extending from the circuit board 170 are connected with the respective terminals 181, 181, . . . . Furthermore, each terminal 181 connects to an external control device (not shown) such as an ECU.

The glow plug with cylinder internal pressure sensor 100 is fixed to the internal combustion engine so that the top end side of the glow plug 100 is positioned in a combustion chamber. Then the heater 150 heats up through energization, and assists an engine start. Under this condition, when the cylinder internal pressure P in the combustion chamber is applied to the top end surface 150a of the heater 150, the heater 150 slightly varies or moves toward the base end side. Through this variation or movement, the cylinder internal pressure P is transmitted to the pressure detecting system 120, then the cylinder internal pressure P is detected.

Figure 6:
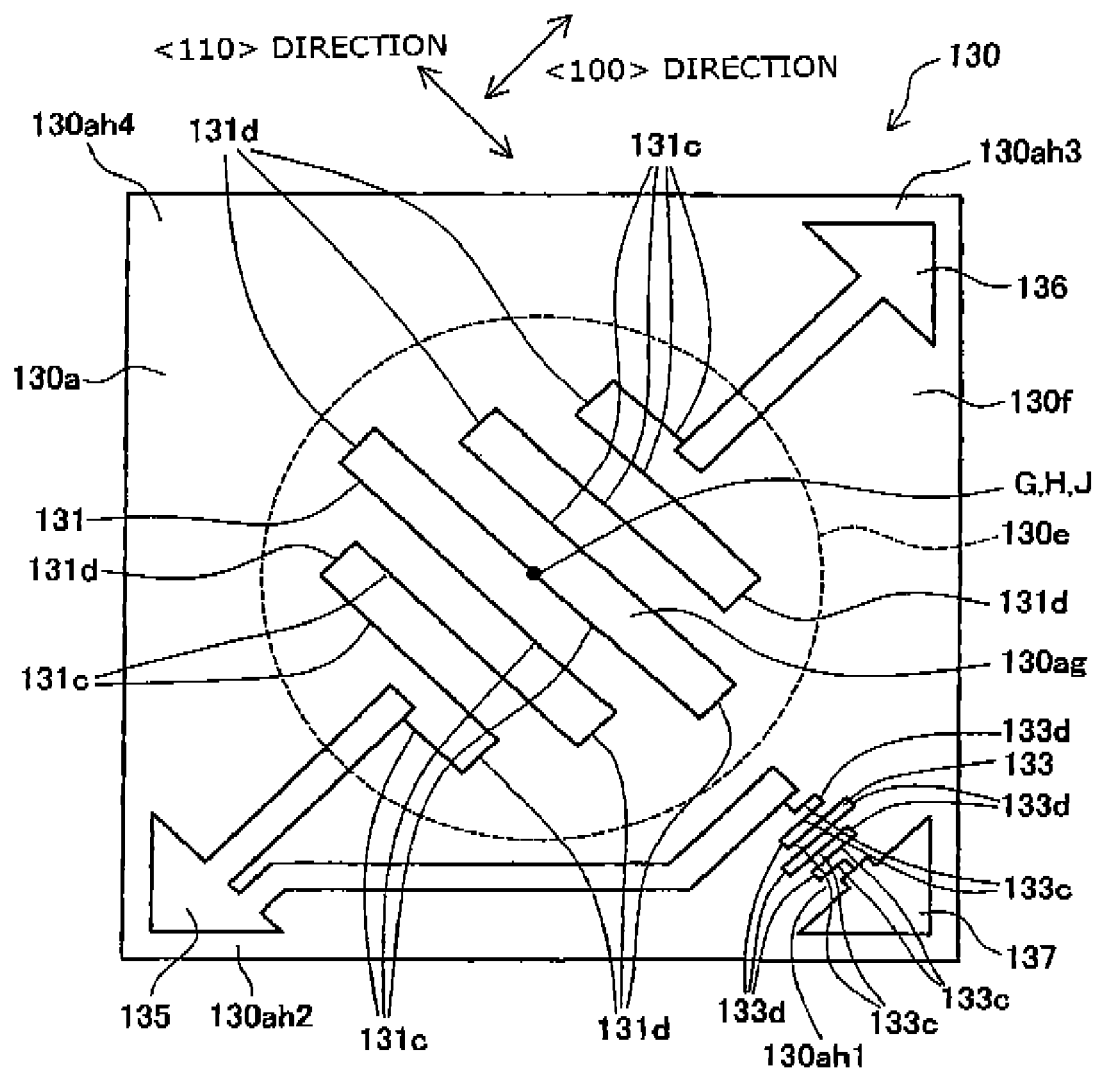
FIG. 6 is a plan view, viewed from a first main surface side of a Si device, of the glow plug with cylinder internal pressure sensor.

Next, the Si device 130 detecting the cylinder internal pressure P will be explained in detail. FIG. 6 shows a plan view of the Si device 130, viewed from the first main surface 130a side. As previously mentioned, the Si device 130 has the first main surface 130a and the second main surface 130b that is parallel to the first main surface 130a, and has the plate shape (rectangular plate shape). The Si device 130 can detect a stress change (or stress variation) occurring to the Si device itself by the cylinder internal pressure P that is an object of detection. This Si device 130 is an SOI substrate (Silicon On Insulator).

Figure 11:
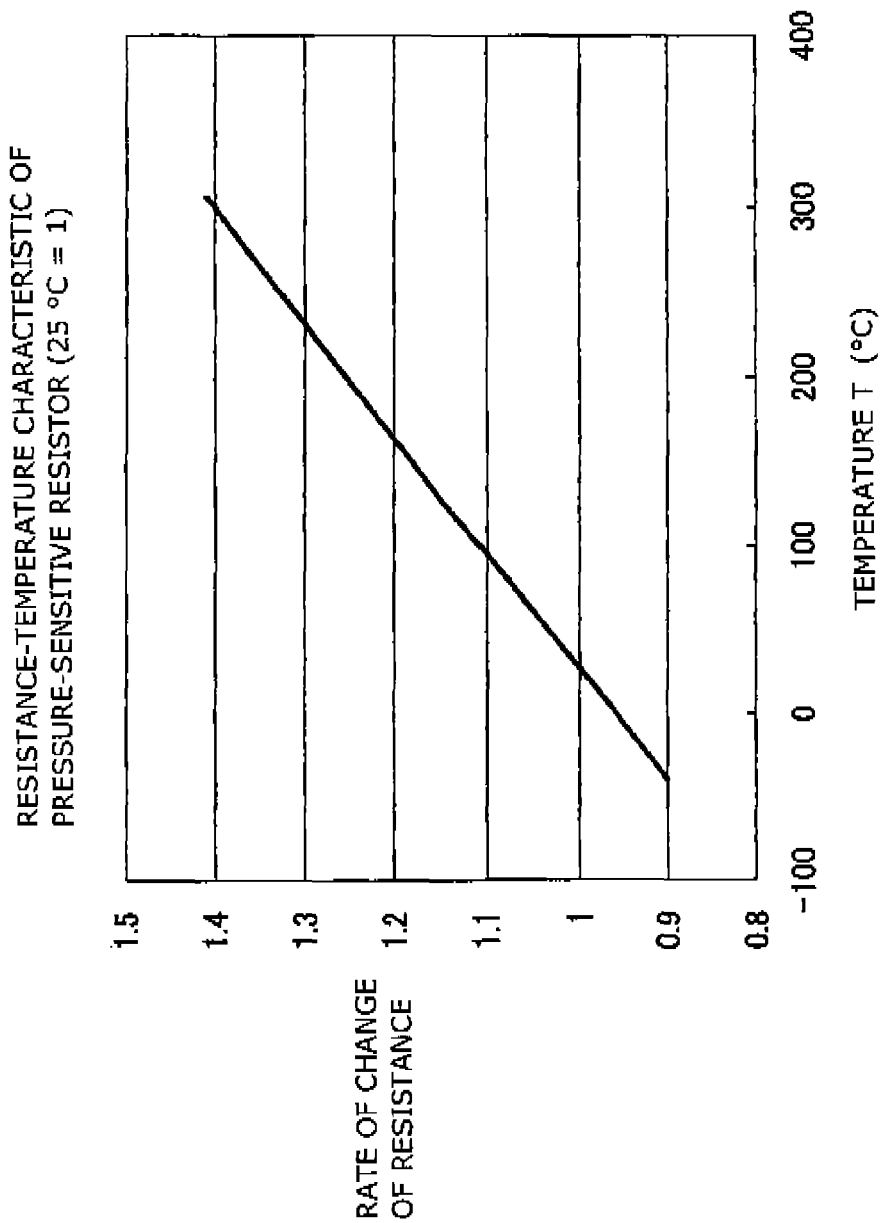
FIG. 11 is a graph showing a relationship between temperature T of the Si device and a rate of change of resistance, of a pressure-sensitive resistor.
Figure 12:
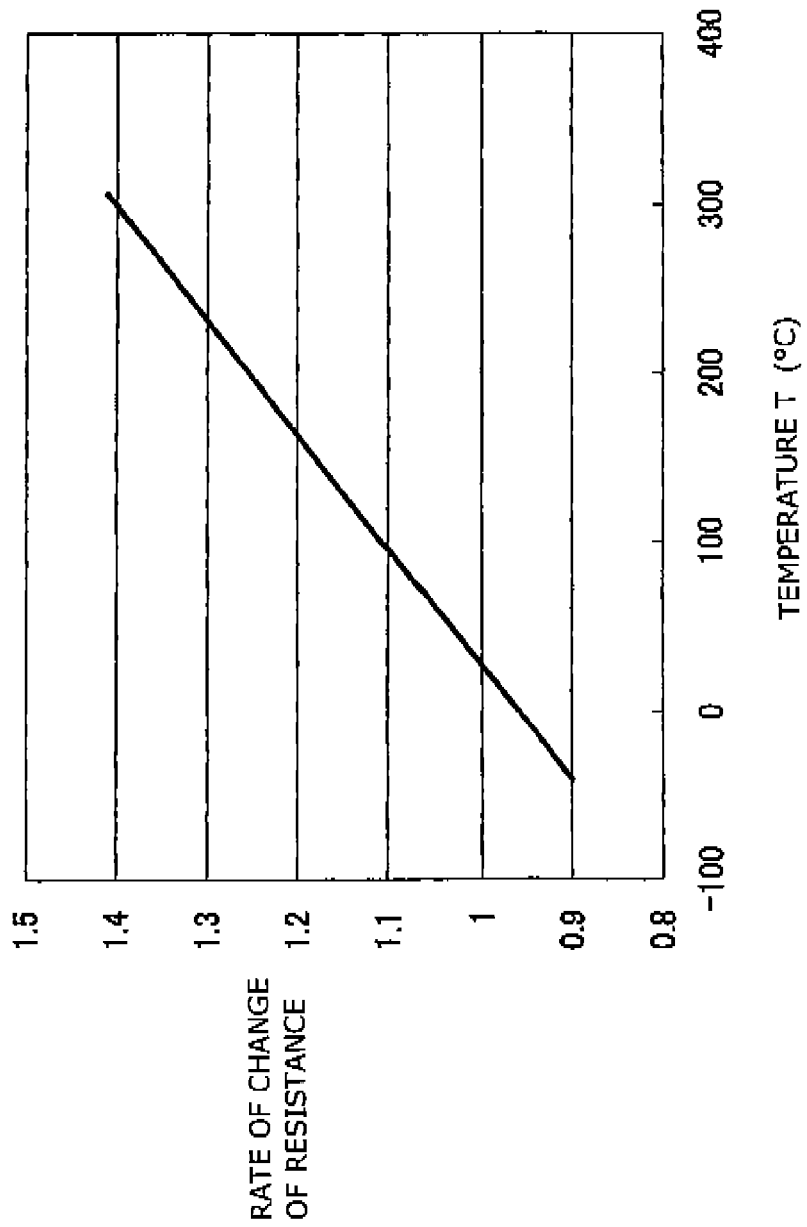
FIG. 12 is a graph showing a relationship between the temperature T of the Si device and a rate of change of resistance, of a temperature-sensitive resistor.

Surface orientation (or crystal orientation) of the first main surface 130a of the Si device 130 is {110} plane (more specifically, (110) plane). On the first main surface 130a, two resistors; the pressure-sensitive resistor 131 and a temperature-sensitive resistor 133, are formed. These pressure-sensitive resistor 131 and temperature-sensitive resistor 133 are resistors that are formed simultaneously through the same diffusion process. Because of this, as shown in FIGS. 11 and 12, both resistance-temperature coefficients are substantially equal to each other. More specifically, a difference between both the resistance-temperature coefficients is nearly 50 ppm/° C. Further, these pressure-sensitive resistor 131 and temperature-sensitive resistor 133 are p-type semiconductors, and its impurity concentration Cp (1/cm$^3$) is, $0.6 \times 10^{18} \leq Cp \leq 1.4 \times 10^{18}/cm^3$, or $0.6 \times 10^{20} \leq Cp \leq 1.4 \times 10^{20}/cm^3$. More specifically, the impurity concentration Cp is $1.0 \times 10^{20}/cm^3$. With this, temperature-sensitivity characteristics of the resistors 131, 133 become smaller than or equal to 500 ppm/° C.

Figure 13:
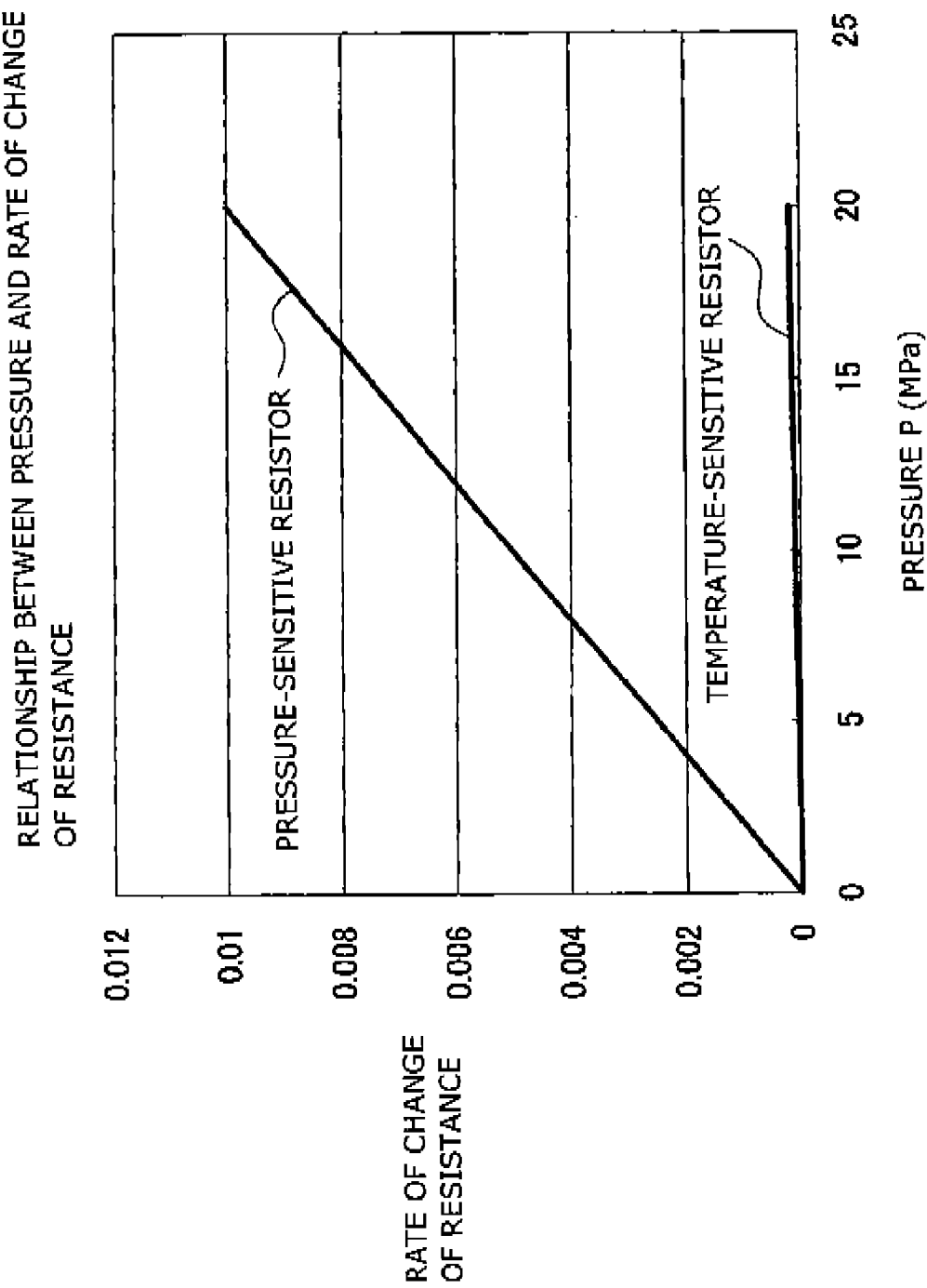
FIG. 13 is a graph showing a relationship between a pressure P and a rate of change of resistance, of the pressure-sensitive resistor and the temperature-sensitive resistor.

The pressure-sensitive resistor 131 is a resistor whose resistance changes or varies according to change of the cylinder internal pressure P by the piezoresistive effect. More specifically, as shown in FIG. 13, a first resistance r1 of the pressure-sensitive resistor 131 itself varies according to the change of the pressure (cylinder internal pressure) P applied from the pressing member 125. In addition to this resistance variation, as shown in FIG. 11, the first resistance r1 of the pressure-sensitive resistor 131 itself varies according to change of the temperature T of the Si device 130 (the pressure-sensitive resistor 131 itself).

As seen in FIG. 6, the pressure-sensitive resistor 131 is formed at a middle area 130ag on the first main surface 130a with a plurality of pressure-sensitive sections extending in <110> direction of the Si device 130 being a main section. That is, the pressure-sensitive resistor 131 is formed from a plurality of linear pressure-sensitive sections 131c, 131c, ... and a plurality of direction turning sections 131d, 131d . . . . The linear pressure-sensitive sections 131c extend linearly in <110> direction, and these are arranged parallel to each other at regular intervals. On the other hand, the direction turning sections 131d connect both ends of adjacent linear pressure-sensitive sections 131c, 131c. The pressure-sensitive resistor 131 is then formed as a serpentine or meandering line like square wave.

This serpentine pressure-sensitive resistor 131 is symmetrical about a center point (center H) of the first main surface 130a. That is, when the first main surface 130a rotates about the center H by 180 degrees, a pattern of the pressure-sensitive resistor 131 is identical with the original pattern. Here, a rotation center G of the pressure-sensitive resistor 131 is positioned on the center H of the first main surface 130a. In the present embodiment, as shown by a circular broken line in FIG. 6, the pressure-sensitive resistor 131 is placed within a circular contact area 130e which the base end surface 125b of the pressing member 125 touches. A center J of this contact area 130e is identical with the rotation center G of the pressure-sensitive resistor 131 and the center H of the first main surface 130a. Through this alignment in the axis AX direction, a center of the pressing member 125 presses the rotation center G of the pressure-sensitive resistor 131. Thus, even if there occurs an offset load to the pressing member 125, it is possible to minimize an effect on the pressure-sensitive resistor 131 by the offset load.

On the other hand, as for the temperature-sensitive resistor 133, as shown in FIG. 12, the resistor 133 is formed so that its own second resistance r2 changes or varies mainly according to the change of the temperature T of the Si device 130 (the pressure-sensitive resistor 131). Since the pressure-sensitive resistor 131 and the temperature-sensitive resistor 133 are formed on the one Si device 130, the temperature T of the pressure-sensitive resistor 131 and a temperature of the temperature-sensitive resistor 133 become substantially equal to each other. The temperature-sensitive resistor 133 is formed in a corner 130ah1 of four corners 130ah1, 130ah2, 130ah3 and 130ah4 on the first main surface 130a with a plurality of temperature-sensitive sections extending in <100> direction of the Si device 130 being a main section. That is, the temperature-sensitive resistor 133 is formed from a plurality of linear temperature-sensitive sections 133c, 133c, ... and a plurality of direction turning sections 133d, 133d . . . . The linear temperature-sensitive sections 133c extend linearly in <100> direction, and these are arranged parallel to each other at regular intervals. On the other hand, the direction turning sections 133d connect both ends of adjacent linear temperature-sensitive sections 133c, 133c. The temperature-sensitive resistor 133 is then formed as a serpentine line like square wave. In the present embodiment, as shown in FIG. 6, the temperature-sensitive resistor 133 is placed in a noncontact area 130f except the contact area 130e (i.e. O-shaped area having four corners, around the contact area 130e), where the pressing member 125 does not touch.

Since the temperature-sensitive resistor 133 is placed in the corner as explained above, the temperature-sensitive resistor 133 is less susceptible to the pressure (cylinder internal pressure P) by the pressing member 125. This will be explained in more detail. As shown in FIG. 13, a variation (rate of change) of the second resistance r2 of the temperature-sensitive resistor 133 occurring according to a change of the pressure (cylinder internal pressure) P is less than or equal to one-tenth (1/10), further one-fiftieth (1/50), of a variation (rate of change) of the first resistance r1 of the pressure-sensitive resistor 131 occurring according to the change of the pressure (cylinder internal pressure) P, (in the present embodiment, it is 1/240).

The Si device 130 is provided with three triangular terminal pads 135, 136 and 137 which are respectively formed in the three corners 130ah1, 130ah2 and 130ah3 on the first main surface 130a. The terminal pad (a first terminal pad) 136 is electrically connected to one end of the pressure-sensitive resistor 131. This first terminal pad 136 is a connection point with an after-mentioned first constant-current source 202. Further, the terminal pad (a second terminal pad) 137 is electrically connected to one end of the temperature-sensitive resistor 133. This second terminal pad 137 is a connection point with an after-mentioned second constant-current source 203. The terminal pad (a third terminal pad) 135 is a common terminal pad, i.e., this third terminal pad 135 is electrically connected to the other end of the pressure-sensitive resistor 131, and also electrically connected to the other end of the temperature-sensitive resistor 133.

Figure 7:
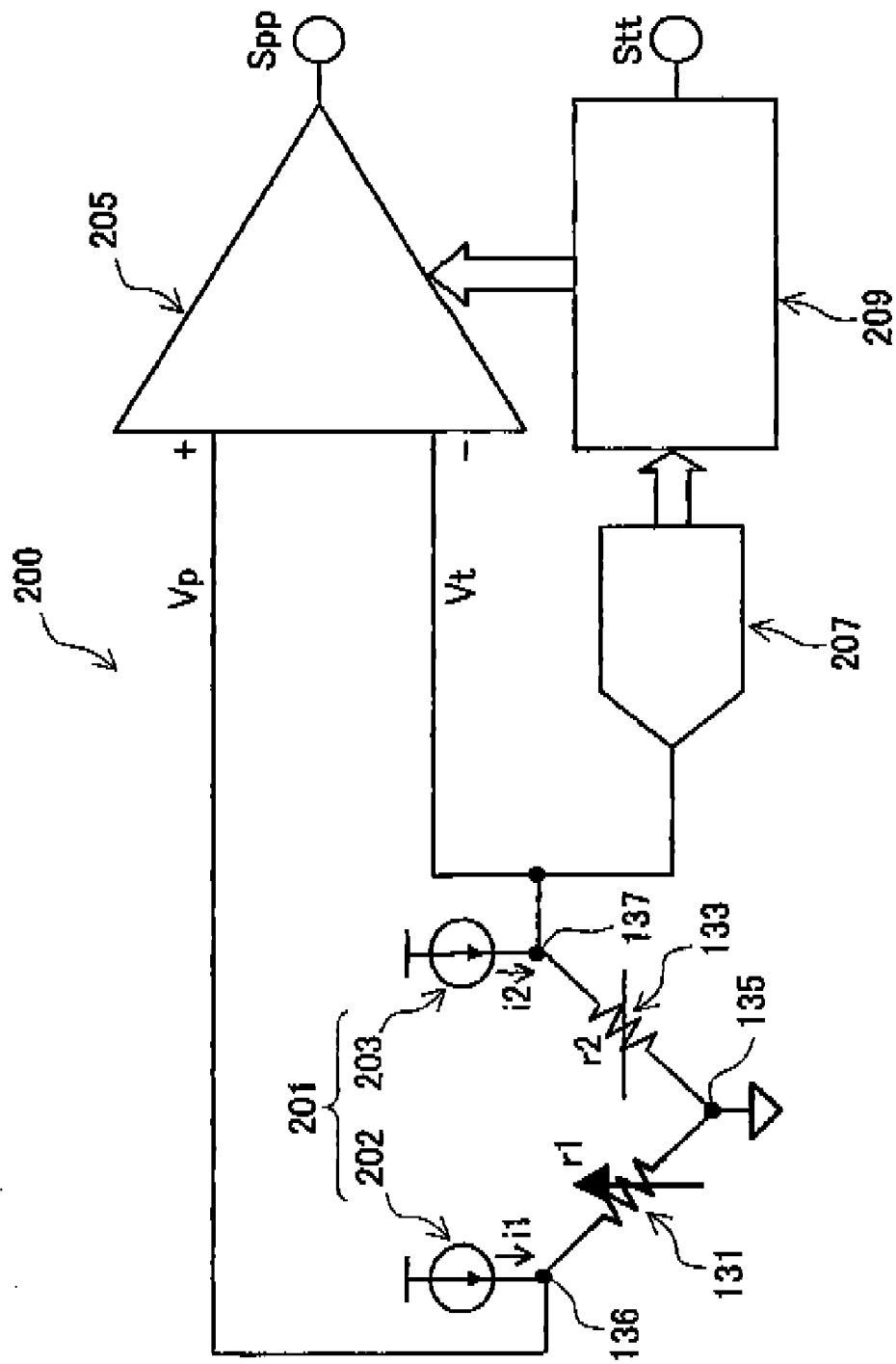
FIG. 7 is a circuit diagram showing a detection circuit of the glow plug with cylinder internal pressure sensor.

Next, a detection circuit 200 for the detection of the cylinder internal pressure P and the temperature T of the Si device 130 (the pressure-sensitive resistor 131) will be explained with reference to FIG. 7. This detection circuit 200 includes the above-mentioned pressure-sensitive resistor 131 and temperature-sensitive resistor 133, also includes the terminal pads 135, 136 and 137 which connect with these resistors 131, 133. The common terminal pad 135 connecting with the other end of the pressure-sensitive resistor 131 and with the other end of the temperature-sensitive resistor 133, is grounded.

The detection circuit 200 has a current source 201 that supplies a current to the pressure-sensitive resistor 131 and the temperature-sensitive resistor 133. The current source 201 has the first constant-current source 202 and the second constant-current source 203. The first constant-current source 202 is connected to the first terminal pad 136 connecting with the one end of the pressure-sensitive resistor 131, and supplies a predetermined first constant-current i1 to the pressure-sensitive resistor 131. The second constant-current source 203 is connected to the second terminal pad 137 connecting with the one end of the temperature-sensitive resistor 133, and supplies a predetermined second constant-current i2 to the temperature-sensitive resistor 133.

The current source 201 adjusts magnitudes of the first constant-current i1 and the second constant-current i2 so that when the pressure P is an initial pressure $P_o$ (more specifically, the pressure $P_o$ is an atmospheric pressure), a reference first voltage Vpo that appears across the pressure-sensitive resistor 131 and a reference second voltage Vto that appears across the temperature-sensitive resistor 133 become equal to each other (more specifically, Vpo=Vto=2V).

The detection circuit 200 has also a variable gain amplifier 205. A noninverting input terminal (+) of the variable gain amplifier 205 is electrically connected to the first terminal pad 136 connecting with the one end of the pressure-sensitive resistor 131. An inverting input terminal (−) of the variable gain amplifier 205 is electrically connected to the second terminal pad 137 connecting with the one end of the temperature-sensitive resistor 133. The variable gain amplifier 205 amplifies a difference voltage (Vp−Vt) between a voltage signal (a first voltage Vp that appears across the pressure-sensitive resistor 131) inputted to the noninverting input terminal (+) and a voltage signal (a second voltage Vt that appears across the temperature-sensitive resistor 133) inputted to the inverting input terminal (−) by a predetermined amplification factor, and outputs a first voltage signal Spp corresponding to the cylinder internal pressure P. In addition, this variable gain amplifier 205 is connected to a storage device 209 (described later), and varies the amplification factor by a signal from the storage device 209.

Furthermore, the detection circuit 200 has an A/D converter 207 and the storage device 209. The A/D converter 207 is connected to the second terminal pad 137 connecting with the one end of the temperature-sensitive resistor 133, while the A/D converter 207 is connected with the storage device 209. The A/D converter 207 converts an analog signal (voltage signal) of the temperature-sensitive resistor 133 to a digital signal, and outputs it to the storage device 209.

The storage device 209 is connected with the variable gain amplifier 205 and the A/D converter 207, as mentioned above. The storage device 209 outputs a second voltage signal Stt corresponding to the temperature T of the Si device 130 (the pressure-sensitive resistor 131) to the outside on the basis of the second voltage Vt appearing across the temperature-sensitive resistor 133. Moreover, in the storage device 209, a proper amplification factor that cancels or compensates for the temperature-sensitivity characteristic is set, and information about a relationship between a temperature sensor signal (the second voltage Vt) and the amplification factor is stored as a correction table. Through this correction table, on the basis of the temperature sensor signal (the second voltage Vt), the amplification factor of the variable gain amplifier 205 is adjusted or controlled, and temperature characteristic compensation, which reduces deviation or shift of the difference voltage (Vp−Vt) caused by a difference of the temperature T, is performed.

Figure 8:
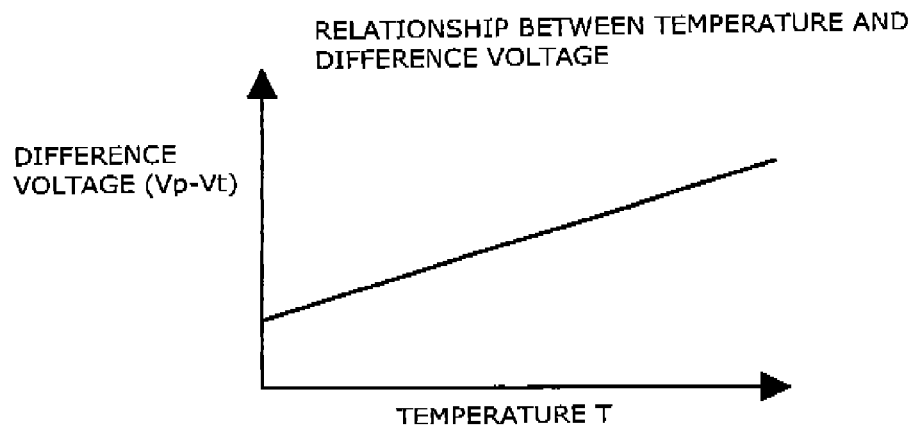
FIG. 8 is a graph showing a relationship between a temperature T of the Si device and a difference voltage (Vp−Vt).
Figure 9:
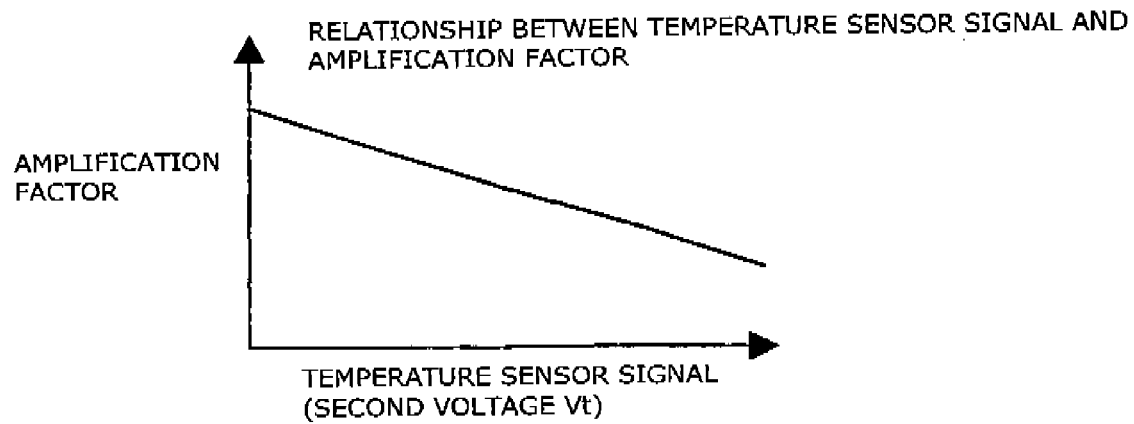
FIG. 9 is a graph showing a relationship between a temperature sensor signal and an amplification factor.
Figure 10:
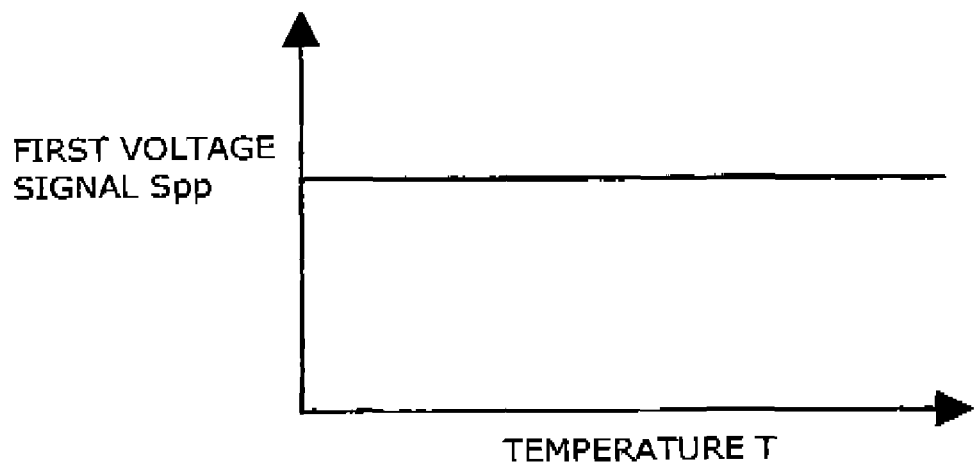
FIG. 10 is a graph showing a relationship between the temperature T of the Si device and a first voltage signal Spp.

More specifically, in the present embodiment, the difference voltage (Vp−Vt) between the pressure-sensitive resistor 131 and the temperature-sensitive resistor 133 has a temperature-sensitivity characteristic as shown in FIG. 8. That is, the pressure-sensitive resistor 131 and the temperature-sensitive resistor 133 have the temperature-sensitivity characteristic in which its difference voltage linearly increases with increase in temperature T. Because of this, as shown in a graph in FIG. 9, an amplification factor for the temperature T, which cancels or offsets the temperature-sensitivity characteristic shown in the graph in FIG. 8, is previously stored in the correction table in the storage device 209. With this, as shown in FIG. 10, the output signal (the first voltage signal Spp) of the variable gain amplifier 205 becomes an output signal that cancels the temperature-sensitivity characteristic. That is to say, even if the temperature T is different, the output signal (the first voltage signal Spp) is unaffected by the difference of the temperature.

Here, in the present invention, the A/D converter 207 and the storage device 209 correspond to a temperature signal generation output means or section. The variable gain amplifier 205, the A/D converter 207 and the storage device 209 correspond to a pressure signal generation output means or section. Further, the variable gain amplifier 205 corresponds to an amplification means or section. Moreover, the storage device 209 corresponds to an amplification factor adjustment means or section.

As explained above, the glow plug with cylinder internal pressure sensor 100 of the present embodiment has the compression type Si device 130 detecting the cylinder internal pressure P by being compressed by the cylinder internal pressure P that is the detection target. Hence, as compared with the diaphragm type Si device, the compression type Si device 130 is advantageous to load-carrying capacity, size reductions and sensitivity. Further, this Si device 130 has two resistors (the pressure-sensitive resistor 131 and the temperature-sensitive resistor 133). Therefore, as compared with the conventional device provided with four resistors, the Si device 130 becomes small. In addition, because the resistors are reduced to two resistors, also because the other end of the pressure-sensitive resistor 131 and the other end of the temperature-sensitive resistor 133 are connected to each other through the common terminal pad 135, the number of wires 165, 165, 165, connecting to the Si device 130, can be reduced to three wires. This also contributes to the miniaturization of the glow plug 100. By miniaturizing the pressure sensor (Si device 130), the glow plug with cylinder internal pressure sensor is easily realized. Further, this facilitates installation of the glow plug 100 to the internal combustion engine.

The glow plug with cylinder internal pressure sensor 100 outputs the first voltage signal Spp corresponding to the cylinder internal pressure P on the basis of the difference voltage (Vp−Vt) between the first voltage Vp appearing across the pressure-sensitive resistor 131 and the second voltage Vt appearing across the temperature-sensitive resistor 133.

With respect to the pressure-sensitive resistor 131, its own first resistance r1 varies not only according to the cylinder internal pressure P, but the first resistance r1 varies according to the temperature T as well. For this reason, the first voltage Vp appearing across the pressure-sensitive resistor 131 upon the detection includes the voltage appearing according to the temperature T besides the voltage appearing according to the cylinder internal pressure P.

On the other hand, with regard to the temperature-sensitive resistor 133, its own second resistance r2 varies mainly according to the temperature T. Thus, the second voltage Vt appearing across the temperature-sensitive resistor 133 is the voltage that mostly corresponds to the temperature T. Accordingly, when measuring the difference voltage (Vp−Vt) between these voltages, the voltage resulting from the temperature T is subtracted from the first voltage Vp appearing across the pressure-sensitive resistor 131. With this measurement, it is possible to accurately detect only the voltage appearing according to the cylinder internal pressure P. That is, the cylinder internal pressure P can be accurately detected while restraining the effect of the temperature T. Consequently, it is favorable to the detection of the cylinder internal pressure P in the internal combustion engine in which a large temperature change occurs. Furthermore, even if the temperature-sensitivity characteristic arises by an error of the impurity concentration of the resistors 131, 133 for each device or product, this measurement or detection can compensate for the error including the temperature-sensitivity characteristic. Thus, as compared with the physical quantity detection device in the patent document 3, it is possible to detect the pressure P, which is the object of detection, with high accuracy while restraining the effect of the temperature T.

Further, the glow plug with cylinder internal pressure sensor 100 has the current source 201 supplying the first constant-current i1 and the second constant-current i2 so that when the pressure P is the initial pressure $P_o$, the reference first voltage Vpo appearing across the pressure-sensitive resistor 131 and the reference second voltage Vto appearing across the temperature-sensitive resistor 133 become equal to each other. Since there is a difference of properties (difference of resistance) between the pressure-sensitive resistor 131 and the temperature-sensitive resistor 133, caused by variation in production (process), a zero-point drift is apt to arise at the initial pressure $P_o$ by the difference of properties. For this problem, in the present embodiment, as explained above, the reference first voltage Vpo appearing across the pressure-sensitive resistor 131 and the reference second voltage Vto appearing across the temperature-sensitive resistor 133 are set to be equal to each other at the initial pressure $P_o$. With this setting, since the difference of properties between the pressure-sensitive resistor 131 and the temperature-sensitive resistor 133 can be cancelled, i.e., since offset cancel can be made, the zero-point drift at the initial pressure $P_o$ can be effectively prevented.

Furthermore, since the glow plug with cylinder internal pressure sensor 100 has the temperature-sensitive resistor 133 and the temperature signal generation output means 207, 209, it is possible to detect not only the cylinder internal pressure P but also the temperature T of the Si device 130 (the pressure-sensitive resistor 131). Here, as mentioned above, the variation (rate of change) of the second resistance r2 of the temperature-sensitive resistor 133 occurring according to the change of the cylinder internal pressure P is sufficiently small. More specifically, as compared with the variation (rate of change) of the first resistance r1 of the pressure-sensitive resistor 131 occurring according to the change of the cylinder internal pressure P, this variation is one-tenth (1/10) or less, (in the present embodiment, it is 1/240). Thus, the temperature T of the Si device 130 can be correctly detected while restraining the effect of the cylinder internal pressure P.

Regarding the pressure-sensitive resistor 131, its own first resistance r1 varies not only according to the change of the cylinder internal pressure P, but the first resistance r1 varies according to the change of the temperature T as well. Further, the variation (sensitivity) of the first resistance r1 according to the change of the cylinder internal pressure P also changes by the effect of the temperature T. That is, the pressure-sensitive resistor 131 has not only the resistance-temperature coefficient but the temperature-sensitivity characteristic. Because of this, also the difference voltage (Vp−Vt) includes the influence of the temperature T by the temperature-sensitivity characteristic.

However, in the present embodiment, the pressure signal generation output means 205, 207, 209 has the amplification means 205 and the amplification factor adjustment means 209, and the amplification factor of the amplification means 205 is adjusted on the basis of the second voltage Vt of the temperature-sensitive resistor 133. And the temperature characteristic compensation reducing deviation or shift of the difference voltage (Vp−Vt), caused by the difference of the temperature T, is performed. The cylinder internal pressure P can be therefore accurately detected while restraining the effect of the temperature T.

As explained above, since the variation (rate of change) of the second resistance r2 of the temperature-sensitive resistor 133 occurring according to the change of the cylinder internal pressure P is one-tenth (1/10) or less (in the present embodiment, it is 1/240) and is sufficiently small as compared with the variation (rate of change) of the first resistance r1 of the pressure-sensitive resistor 131, it is possible to correctly detect the temperature T of the Si device 130 (the pressure-sensitive resistor 131) on the basis of the second voltage Vt of the temperature-sensitive resistor 133 while restraining the effect of the cylinder internal pressure P. Therefore, by performing the above temperature characteristic compensation on the basis of the second voltage Vt of the temperature-sensitive resistor 133, the cylinder internal pressure P can be detected more accurately.

In the glow plug with cylinder internal pressure sensor 100, the surface orientation of the first main surface 130a of the Si device 130 is {110} plane (more specifically, (110) plane). By employing the compression type Si device 130 whose pressure-receiving surface of the cylinder internal pressure P is {110} plane, as compared with the diaphragm type Si device, besides realizing the size reduction, the load-carrying capacity can be improved. Thus it is especially favorable to the detection of the cylinder internal pressure P of the high pressure in the internal combustion engine.

Further, in the glow plug with cylinder internal pressure sensor 100, the pressure-sensitive resistor 131 is formed with the plurality of linear pressure-sensitive sections 131c extending in <110> direction of the Si device 130 being the main section, and further is placed within the circular contact area 130e which the pressing member 125 touches on the first main surface 130a. As a consequence, detection sensitivity of the pressure-sensitive resistor 131 for the cylinder internal pressure P becomes especially high, and besides, the resistance change of the pressure-sensitive resistor 131 can occur properly and accurately in response to the cylinder internal pressure P.

On the other hand, the temperature-sensitive resistor 133 is formed with the plurality of linear temperature-sensitive sections 133c extending in <100> direction of the Si device 130 being the main section, and further is placed in the noncontact area 130f except the contact area 130e, where the pressing member 125 does not touch. As a consequence, detection sensitivity of the temperature-sensitive resistor 133 for the cylinder internal pressure P becomes especially small, namely that pressure dependence of the temperature-sensitive resistor 133 can be especially diminished. With this setting, in the present embodiment, the variation (rate of change) of the second resistance r2 of the temperature-sensitive resistor 133 becomes less than or equal to one-tenth (1/10) (more specifically, 1/240) of the variation (rate of change) of the first resistance r1 of the pressure-sensitive resistor 131.

Further, both the pressure-sensitive resistor 131 and temperature-sensitive resistor 133 in the glow plug 100 are formed simultaneously through the same diffusion process. It is therefore possible that both their resistance-temperature coefficients are substantially equal to each other (in the present embodiment, the difference between both the resistance-temperature coefficients is 50 ppm/° C. or less).

Moreover, the impurity concentration Cp (1/cm$^3$) of the pressure-sensitive resistor 131 and the temperature-sensitive resistor 133 is, $0.6 \times 10^{18} \leq Cp \leq 1.4 \times 10^{18}$/cm$^3$, or $0.6 \times 10^{20} \leq Cp \leq 1.4 \times 10^{20}$/cm$^3$ (more specifically, it is $1.0 \times 10^{20}$/cm$^3$). With this, the temperature-sensitivity characteristics of the resistors 131, 133 become smaller than or equal to 500 ppm/° C. Thus, upon the detection of the cylinder internal pressure P, the effect of the temperature T can be further lessened.

In the glow plug with cylinder internal pressure sensor 100, the Si device 130 has the terminal pad 136 that is the connection point with the one end of the pressure-sensitive resistor 131 and the first constant-current source 202, the terminal pad 137 that is the connection point with the one end of the temperature-sensitive resistor 133 and the second constant-current source 203, and the common terminal pad 135 connecting with the other end of the pressure-sensitive resistor 131 and the other end of the temperature-sensitive resistor 133. This connection or arrangement allows the reduction of the number of terminal pads to three pads, and thereby miniaturizing the Si device 130. Further, with this reduction, the number of wires 165, 165, 165, connecting to the terminal pads 135, 136, 137, can be reduced to three wires. Miniaturization of the glow plug with cylinder internal pressure sensor 100 can be therefore achieved.

Furthermore, since the Si device 130 is the SOI substrate, a decrease in insulation resistance can be suppressed, and high temperature resistance of the Si device 130 can be improved. Thus, the glow plug with cylinder internal pressure sensor 100 is advantageous to use in the internal combustion engine under the high temperature condition upon the detection of the cylinder internal pressure P.

Although the present invention has been described above on the basis of the embodiment, the invention is not limited to the embodiment. For instance, in the above embodiment, the pressure detection apparatus 100 in which the pressure detecting system 120 is built in the glow plug, is shown. However, the pressure detection apparatus is not limited to this. The pressure detection apparatus could be the pressure detection apparatus that detects the cylinder internal pressure P without serving as the glow plug.

Further, in the above embodiment, the SOI substrate is employed for the Si device 130 so as to improve the high temperature resistance of the Si device 130. However, if the glow plug with cylinder internal pressure sensor 100 has a structure in which the Si device 130 is not exposed to the high temperature, the Si device 130 could use a Si device except the SOI substrate.

Furthermore, in the glow plug with cylinder internal pressure sensor 100 in the above embodiment, the storage device 209 outputs the second voltage signal Stt corresponding to the temperature T of the Si device 130 (the pressure-sensitive resistor 131) to the outside. Instead, a storage device that does not output the second voltage signal Stt to the outside could be provided in the glow plug with cylinder internal pressure sensor 100.

Figure 14:
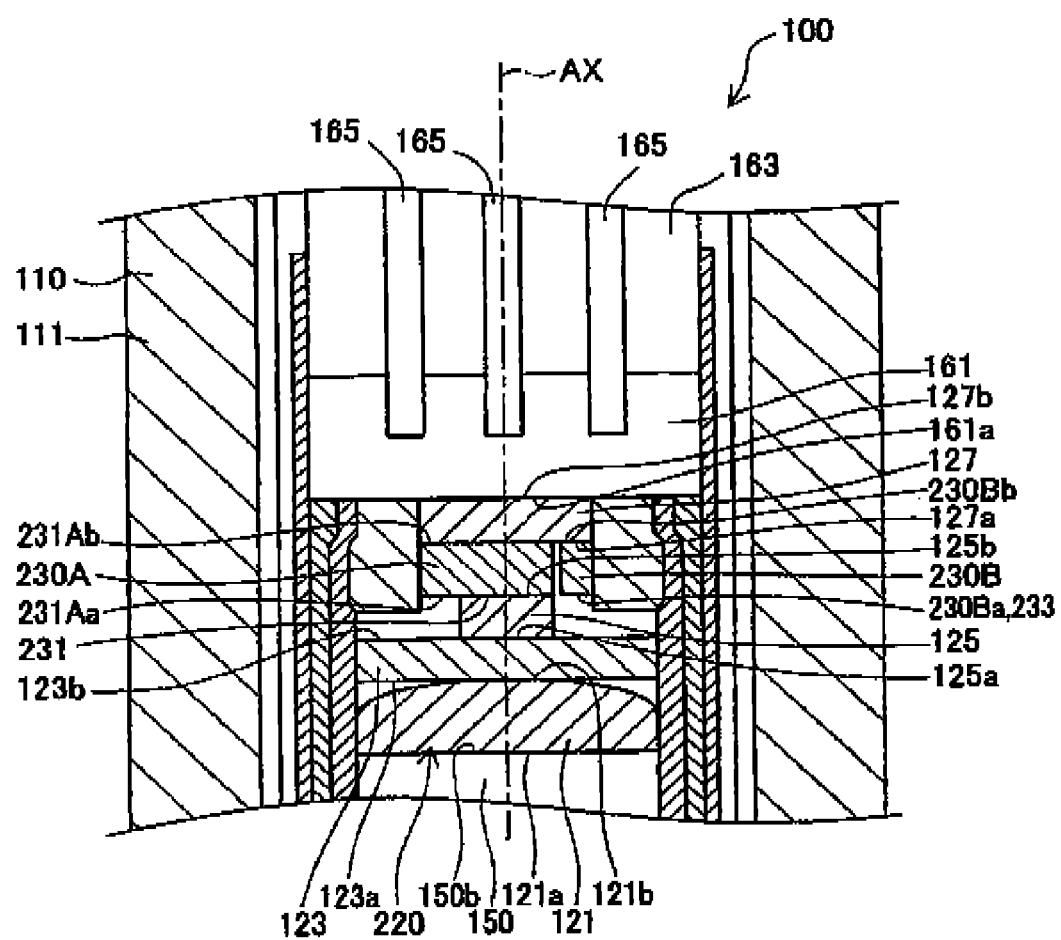
FIG. 14 is a locally enlarged sectional view showing a pressure detecting system and its surrounding components, of a glow plug with cylinder internal pressure sensor undergoing modification.

Moreover, in the above embodiment, two resistors; the pressure-sensitive resistor 131 and the temperature-sensitive resistor 133, are formed on the one Si device 130. However, the following modification is possible. For example, as an arrangement or configuration of the resistors, the pressure-sensitive resistor and the temperature-sensitive resistor could be formed on different devices. These pressure-sensitive resistor and temperature-sensitive resistor have the substantially same resistance-temperature-coefficient, and the temperature-sensitive resistor is formed so that its own second resistance r2 varies according to the temperature T of the pressure-sensitive resistor. In this case, the modification must have at least a configuration in which the stress corresponding to the pressure P is applied to the pressure-sensitive resistor. Further, it is desirable that the temperature-sensitive resistor should be formed so that the stress corresponding to the pressure P is not applied to the temperature-sensitive resistor. This will be explained in more detail. For instance, as shown in FIG. 14, in a glow plug with cylinder internal pressure sensor, instead of the Si device 130, a first Si device 230A where a pressure-sensitive resistor 231 is formed on its first main surface 230Aa, and a second Si device 230B where a temperature-sensitive resistor 233 is formed on its first main surface 230Ba, could be provided. These first Si device 230A and second Si device 230B are supported by the supporting member 127, then only the pressure-sensitive resistor 231 of the first Si device 230A is pressed by the pressing member 125. Here, the pressure-sensitive resistor 231 and the temperature-sensitive resistor 233 are close together. Thus, their temperatures (i.e. temperature T of the pressure-sensitive resistor 231 and temperature of the temperature-sensitive resistor 233) become substantially equal to each other.

From the foregoing, the present invention gains the advantages and effects as follows.

In the present invention, a pressure detection apparatus comprises: a pressure-sensitive resistor (131; 231) whose first resistance r1 varies according to a change of a pressure P, which is an object of detection, and a change of a temperature T of the pressure-sensitive resistor (131; 231) itself; a temperature-sensitive resistor (133; 233) which has a same resistance-temperature coefficient as the pressure-sensitive resistor (131; 231) and whose second resistance r2 varies according to the change of the temperature T; a current source (201) for supplying a current to the pressure-sensitive resistor (131; 231) and the temperature-sensitive resistor (133; 233), the current source (201) having a first constant-current source (202) that supplies a predetermined first constant-current i1 to the pressure-sensitive resistor (131; 231), and a second constant-current source (203) that supplies a predetermined second constant-current i2 to the temperature-sensitive resistor (133; 233), and the current source (201) adjusting magnitudes of the predetermined first constant-current i1 and the predetermined second constant-current i2 so that when the pressure P is an initial pressure $P_o$, a reference first voltage Vpo that appears across the pressure-sensitive resistor (131; 231) and a reference second voltage Vto that appears across the temperature-sensitive resistor (133; 233) become equal to each other; and a pressure signal generation output section (205, 207, 209) which generates and outputs a first voltage signal Spp corresponding to the pressure P on the basis of a difference voltage (Vp−Vt) between a first voltage Vp that appears across the pressure-sensitive resistor (131; 231) in accordance with the pressure P and a second voltage Vt that appears across the temperature-sensitive resistor (133; 233).

In the pressure detection apparatus, the first voltage signal Spp corresponding to the pressure P is generated and outputted on the basis of the difference voltage (Vp−Vt) between the first voltage Vp that appears across the pressure-sensitive resistor (131; 231) in accordance with the pressure P and the second voltage Vt that appears across the temperature-sensitive resistor (133; 233). Regarding the pressure-sensitive resistor (131; 231), for example, as shown in FIGS. 13 and 11, its own first resistance r1 varies not only according to the change of the pressure P, but the first resistance r1 varies according to the change of the temperature T as well. Because of this, the first voltage Vp appearing across the pressure-sensitive resistor (131; 231) upon the detection of the pressure P includes the voltage appearing according to the temperature T besides the voltage appearing according to the pressure P.

On the other hand, as for the temperature-sensitive resistor (133; 233), as can be seen in FIGS. 12 and 13, while its own second resistance r2 greatly varies according to the change of the temperature T, there is almost no change in the second resistance r2 in accordance with the change of the pressure P. More specifically, the variation (rate of change) of the second resistance r2 of the temperature-sensitive resistor (133; 233) occurring according to the change of the pressure P is less than or equal to one-tenth (1/10) of the variation (rate of change) of the first resistance r1 of the pressure-sensitive resistor (131; 231) occurring according to the change of the pressure P. In this way, since the second resistance r2 of the temperature-sensitive resistor (133; 233) varies mainly according to the change of the temperature T, the second voltage Vt appearing across the temperature-sensitive resistor (133; 233) is the voltage that mostly corresponds to the temperature T. Accordingly, when measuring the difference voltage (Vp−Vt) between these voltages, the voltage resulting from the temperature T is subtracted from the first voltage Vp appearing across the pressure-sensitive resistor (131; 231). With this measurement, it is possible to accurately detect only the voltage appearing according to the pressure P. That is, the pressure P of the detection target can be accurately detected while restraining the effect of the difference of the temperature T of the pressure-sensitive resistor (131; 231). Furthermore, even if the temperature-sensitivity characteristic arises by an error of the impurity concentration of the resistors (131; 231, 133; 233) for each device or product, in a case where the temperatures of the pressure-sensitive resistor (131; 231) and the temperature-sensitive resistor (133; 233) can be set to be substantially equal to each other, this measurement or detection can compensate for the error including the temperature-sensitivity characteristic. Thus, as compared with the physical quantity detection device in the patent document 3, it is possible to detect the pressure P, which is the object of detection, with high accuracy while restraining the effect of the temperature T.

Further, the pressure detection apparatus has the current source (201) supplying the first constant-current i1 and the second constant-current i2 so that when the pressure P is the initial pressure $P_o$, the reference first voltage Vpo appearing across the pressure-sensitive resistor (131; 231) and the reference second voltage Vto appearing across the temperature-sensitive resistor (133; 233) become equal to each other. Since there is the difference of properties (difference of resistance) between the pressure-sensitive resistor (131; 231) and the temperature-sensitive resistor (133; 233), caused by variation in production (process), the zero-point drift is apt to arise at the initial pressure $P_o$ by the difference of properties. For this problem, in the pressure detection apparatus, as explained above, the reference first voltage Vpo appearing across the pressure-sensitive resistor (131; 231) and the reference second voltage Vto appearing across the temperature-sensitive resistor (133; 233) are set to be equal to each other at the initial pressure $P_o$. With this setting, since the difference of properties between the pressure-sensitive resistor (131; 231) and the temperature-sensitive resistor (133; 233) can be cancelled, i.e., since offset cancel can be made, the zero-point drift at the initial pressure $P_o$ can be effectively prevented.

Here, "the resistance-temperature coefficients of the pressure-sensitive resistor and the temperature-sensitive resistor are equal to each other" means that the both resistance-temperature coefficients are substantially equal to each other. More specifically, a difference between the both resistance-temperature coefficients is 100 ppm/°C. or less. With respect to the initial pressure $P_o$, for instance, it could be the atmospheric pressure. Further, in a case where the pressure detection apparatus is configured so that a preload is provided to the pressure-sensitive resistor, the initial pressure $P_o$ could be a pressure of a condition in which the preload is applied.

In the pressure detection apparatus, one end of the pressure-sensitive resistor (131; 231) and one end of the temperature-sensitive resistor (133; 233) are connected to the first constant-current source (202) and the second constant-current source (203) respectively, and the other end of the pressure-sensitive resistor (131; 231) and the other end of the temperature-sensitive resistor (133; 233) are connected to each other.

In the pressure detection apparatus, by measuring the electric potentials of the three points; the connected other ends of the pressure-sensitive resistor (131; 231) and the temperature-sensitive resistor (133; 233), the one end of the pressure-sensitive resistor (131; 231) and the one end of the temperature-sensitive resistor (133; 233), the difference voltage (Vp−Vt) can be obtained. Thus, the difference voltage (Vp−Vt) and further the pressure P can be correctly detected through even easier and simpler wiring.

The pressure detection apparatus further comprises: a temperature signal generation output section (207, 209) which generates and outputs a second voltage signal Stt corresponding to the temperature T on the basis of the second voltage Vt of the temperature-sensitive resistor (133; 233).

Since the pressure detection apparatus has the temperature-sensitive resistor (133; 233) and the temperature signal generation output section (207, 209), it is possible to detect not only the pressure P but also the temperature T of the pressure-sensitive resistor (131; 231). Here, as shown in FIG. 13, it is desirable that the variation (rate of change) of the second resistance r2 of the temperature-sensitive resistor (133; 233) occurring according to the change of the pressure P be sufficiently small. More specifically, it is desirable that this variation be one-tenth (1/10) or less of the variation (rate of change) of the first resistance r1 of the pressure-sensitive resistor (131; 231) occurring according to the change of the pressure P. With this, the temperature T of the pressure-sensitive resistor can be correctly detected while restraining the effect of the pressure P. Additionally, it is more desirable that the variation (rate of change) of the second resistance r2 of the temperature-sensitive resistor (133; 233) occurring according to the change of the pressure P be 1/50 or less of the variation (rate of change) of the first resistance r1 of the pressure-sensitive resistor (131; 231) occurring according to the change of the pressure P.

In the pressure detection apparatus, the pressure signal generation output section (205, 207, 209) has an amplification section (205) which amplifies the difference voltage (Vp−Vt) and outputs the first voltage signal Spp; and an amplification factor adjustment section (209) which controls an amplification factor of the amplification section (205) on the basis of the second voltage Vt of the temperature-sensitive resistor (133; 233), and performs temperature characteristic compensation, which reduces deviation of the difference voltage (Vp−Vt) caused by a difference of the temperature T.

Regarding the pressure-sensitive resistor (131; 231), its own first resistance r1 varies not only according to the change of the pressure P, but the first resistance r1 varies according to the change of the temperature T as well. Further, the variation (sensitivity) of the first resistance r1 according to the change of the pressure P also changes by the effect of the temperature T. That is, the pressure-sensitive resistor (131; 231) has not only the resistance-temperature coefficient but the temperature-sensitivity characteristic. Because of this, also the difference voltage (Vp−Vt) includes the influence of the temperature T by the temperature-sensitivity characteristic.

However, in the pressure detection apparatus, the pressure signal generation output section (205, 207, 209) has the amplification section (205) and the amplification factor adjustment section (209), and the amplification factor of the amplification section (205) is adjusted on the basis of the second voltage Vt of the temperature-sensitive resistor (133; 233). And the temperature characteristic compensation reducing deviation or shift of the difference voltage (Vp−Vt), caused by the difference of the temperature T, is performed. The pressure P of the detection target can be therefore accurately detected while restraining the effect of the temperature T.

As explained above, when setting the variation (rate of change) of the second resistance r2 of the temperature-sensitive resistor (133; 233) occurring according to the change of the pressure P to one-tenth (1/10) or less of the variation (rate of change) of the first resistance r1 of the pressure-sensitive resistor (131; 231), it becomes possible to correctly detect the temperature T of the pressure-sensitive resistor (131; 231) on the basis of the second voltage Vt of the temperature-sensitive resistor (133; 233) while restraining the effect of the pressure P. Therefore, by performing the above temperature characteristic compensation on the basis of the second voltage Vt of the temperature-sensitive resistor (133; 233), the pressure P can be detected more accurately.

The pressure detection apparatus further comprises: a plate-shaped Si device (130) which has a first main surface (130a) and a second main surface (130b) that is parallel to the first main surface (130a); a supporting member (127) which is contiguous with the second main surface (130b) of the Si device (130) and supports the Si device (130); and a pressing member (125) which is contiguous with the first main surface (130a) of the Si device (130) and compresses the Si device (130) between the supporting member (127) and the pressing member (125) by pressing the first main surface (130a) by a pressing force according to the pressure P, and the pressure-sensitive resistor (131; 231) and the temperature-sensitive resistor (133; 233) are formed on the first main surface (130a) of the Si device (130), the second resistance r2 of the temperature-sensitive resistor (133; 233) varies mainly according to the temperature T, and a variation of the second resistance r2 occurring according to a change of the pressure P is one-tenth (1/10) or less of a variation of the first resistance r1 occurring according to the change of the pressure P.

The pressure detection apparatus has the pressure-sensitive resistor (131; 231) and the temperature-sensitive resistor (133; 233), and also has the compression type Si device (130) that is compressed by the pressure P of the detection target. Hence, as compared with the diaphragm type Si device disclosed in Patent Document 3, the compression type Si device (130) is advantageous to load-carrying capacity, size reductions and sensitivity. Further, this Si device (130) has two resistors (the pressure-sensitive resistor (131; 231) and the temperature-sensitive resistor (133; 233)). Therefore, as compared with the compression type Si provided with four resistors, the Si device (130) can be further miniaturized. In addition, because the resistors are reduced, to two is resistors, the number of wires, connecting to the Si device (130), can be reduced. This also contributes to the miniaturization of the pressure detection apparatus.

Furthermore, even if the temperature-sensitivity characteristic arises by an error of the impurity concentration of the resistors 131, 133 for each device or product, the detection can compensate for the error including the temperature-sensitivity characteristic. Thus, as compared with the physical quantity detection device in the patent document 3, it is possible to detect the pressure P, which is the object of detection, with high accuracy while restraining the effect of the temperature T.

In the pressure detection apparatus, the first main surface (130a) of the Si device (130) has a contact area (130e) which the pressing member (125) touches; and a noncontact area (130f) which the pressing member (125) does not touch, surface orientation of the first main surface (130a) is {110} plane, and the pressure-sensitive resistor (131; 231) is formed mainly from pressure-sensitive sections (131c) which extend in <110> direction of the Si device (130), and placed in the contact area (130e) of the first main surface (130a), and the temperature-sensitive resistor (133; 233) is formed mainly from temperature-sensitive sections (133c) which extend in <100> direction of the Si device (130), and placed in the noncontact area (130f) of the first main surface (130a).

In the pressure detection apparatus, the surface orientation of the first main surface (130a) of the Si device (130) is {110} plane. By employing the compression type Si device 130 whose pressure-receiving surface of the cylinder internal pressure P is {110} plane, as compared with the diaphragm type Si device, besides realizing the size reduction, the load-carrying capacity can be improved. Thus it is especially favorable to the detection of a high pressure P, such as the cylinder internal pressure P of the high pressure in the internal combustion engine.

Further, in the pressure detection apparatus, the pressure-sensitive resistor (131; 231) is formed mainly from pressure-sensitive sections (131c) which extend in <110> direction of the Si device (130), and placed in the contact area (130e) which the pressing member (125) touches. As a consequence, detection sensitivity of the pressure-sensitive resistor (131; 231) for the pressure P becomes especially high, and besides, the resistance change of the pressure-sensitive resistor (131; 231) can occur properly and accurately in response to the pressure P.

On the other hand, the temperature-sensitive resistor (133; 233), it is formed mainly from temperature-sensitive sections (133c) which extend in <100> direction of the Si device (130), and placed in the noncontact area (130f) which the pressing member (125) does not touch. As a consequence, detection sensitivity of the temperature-sensitive resistor (133; 233) for the pressure P becomes especially small, namely that pressure dependence of the temperature-sensitive resistor (133; 233) can be especially diminished. Therefore, the above setting of the variation (rate of change) of the second resistance r2 of the temperature-sensitive resistor (133; 233) to the one-tenth (1/10) or less of the variation (rate of change) of the first resistance r1 of the pressure-sensitive resistor (131; 231), can be easily achieved.

Here, {110} plane indicates (110) plane or an equivalent surface orientation to this (110) plane. <110> direction indicates [110] direction or an equivalent crystal orientation to this [110] direction. Further, <100> direction indicates [100] direction or an equivalent crystal orientation to this [100] direction.

In the pressure detection apparatus, the pressure-sensitive resistor (131; 231) and the temperature-sensitive resistor (133; 233) are formed simultaneously through a same diffusion process.

In the pressure detection apparatus, both the pressure-sensitive resistor (131; 231) and temperature-sensitive resistor (133; 233) are formed simultaneously through the same diffusion process. It is therefore possible that both their resistance-temperature coefficients are substantially equal to each other (in the present invention, as mentioned above, the difference between both the resistance-temperature coefficients is 100 ppm/° C. or less).

In the pressure detection apparatus, the pressure-sensitive resistor (131; 231) and the temperature-sensitive resistor (133; 233) are p-type semiconductors, and its impurity concentration Cp (1/cm$^3$) is either one of $0.6\times10^{18} \leq Cp \leq 1.4\times10^{18}$ or $0.6\times10^{20} \leq Cp \leq 1.4\times10^{20}$.

By setting the impurity concentration Cp (1/cm$^3$) of the pressure-sensitive resistor and the temperature-sensitive resistor to $0.6\times10^{18} \leq Cp \leq 1.4\times10^{18}$/cm$^3$, or $0.6\times10^{20} \leq Cp \leq 1.4\times10^{20}$/cm$^3$, it was found that the temperature-sensitivity characteristics of these resistors can be sufficiently small upon the detection of the pressure P. Thus the pressure detection apparatus can further diminish the effect of the temperature T.

In the pressure detection apparatus, the Si device (130) has the following terminal pads on the first main surface (130a); a first terminal pad (136) that is a connection point connecting the one end of the pressure-sensitive resistor (131; 231) and the first constant-current source (202); a second terminal pad (137) that is a connection point connecting the one end of the temperature-sensitive resistor (133; 233) and the second constant-current source (203); and a third terminal pad (135) that is a common pad connecting the other end of the pressure-sensitive resistor (131; 231) and the other end of the temperature-sensitive resistor (133; 233).

In the pressure detection apparatus, the Si device (130) has the three terminal pads on the first main surface (130a). That is, the Si device (130) has a first terminal pad (136) that is a connection point connecting the one end of the pressure-sensitive resistor (131; 231) and the first constant-current source (202), a second terminal pad (137) that is a connection point connecting the one end of the temperature-sensitive resistor (133; 233) and the second constant-current source (203), and a third terminal pad (135) that is a common pad connecting the other end of the pressure-sensitive resistor (131; 231) and the other end of the temperature-sensitive resistor (133; 233). This connection or arrangement allows the reduction of the number of terminal pads to three pads, and thereby miniaturizing the Si device (130). Further, with this reduction, the number of wires (165, 165, 165), connecting to the terminal pads (135, 136, 137), can be reduced to three wires. Miniaturization of the pressure detection apparatus can be therefore achieved.

In the pressure detection apparatus, the Si device (130) is an SOI substrate.

Since the Si device 130 is the SOI substrate (Silicon On Insulator), the decrease in insulation resistance can be suppressed, and high temperature resistance of the Si device (130) can be improved.

The pressure detection apparatus is configured so that the pressure detection apparatus can be secured to an internal combustion engine and the pressing force of the first main surface (130a) from the pressing member (125) varies according to a change of a cylinder internal pressure (P) of the internal combustion engine.

The pressure detection apparatus of the present invention is configured so that the pressure detection apparatus can be secured to the internal combustion engine, and detects the cylinder internal pressure (P) of the internal combustion engine. As explained above, since the pressure detection apparatus can detect the pressure P with high accuracy while reducing the effect of the temperature T, the cylinder internal pressure (P) of the internal combustion engine in which the large temperature change occurs can be accurately detected. Furthermore, the pressure detection apparatus can be miniaturized, thus this facilitates installation of the pressure detection apparatus to the internal combustion engine. Moreover, because Si device (130) can be miniaturized and the number of wires can be reduced, the pressure detection apparatus could be used together with other parts or components used for the internal combustion engine. For example, the pressure detection apparatus could be built in a glow plug as a built-in pressure detection apparatus.

The entire contents of Japanese Patent Applications No. 2008-252244 filed on Sep. 30, 2008 and No. 2009-215982 filed on Sep. 17, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A pressure detection apparatus comprising:
a pressure-sensitive resistor whose first resistance $r_1$ varies according to a change of a pressure P, which is an object of detection, and a change of a temperature T of the pressure-sensitive resistor itself;
a temperature-sensitive resistor which has a same resistance-temperature coefficient as the pressure-sensitive resistor and whose second resistance $r_2$ varies according to the change of the temperature T;
wherein one end of the pressure-sensitive resistor and one end of the temperature-sensitive resistor are connected to the first constant-current source and the second constant-current source respectively, and the other end of the pressure-sensitive resistor and the other end of the temperature-sensitive resistor are connected to each other;
a current source for supplying a current to the pressure-sensitive resistor and the temperature sensitive resistor, the current source having a first constant-current source that supplies a predetermined first constant current $i_1$ to the pressure-sensitive resistor, and a second constant-current source that supplies a predetermined second constant-current $i_2$ to the temperature-sensitive resistor, and
the current source adjusting magnitudes of the predetermined first constant-current $i_1$ and the predetermined second constant-current $i_2$ so that when the pressure P is an initial pressure $P_o$, a reference first voltage $V_{po}$ that appears across the pressure-sensitive resistor and a reference second voltage $V_{to}$ that appears across the temperature sensitive resistor become equal to each other; and a pressure signal generation output section which generates and outputs a first voltage signal $S_{pp}$ corresponding to the pressure P on the basis of a difference voltage $(V_p-V_t)$ between a first voltage $V_p$ that appears across the pressure-sensitive resistor in accordance with the pressure P and a second voltage $V_t$ that appears across the temperature-sensitive resistor.

2. The pressure detection apparatus as claimed in claim 1, further comprising:
a temperature signal generation output section which generates and outputs a second voltage signal Stt corresponding to the temperature T on the basis of the second voltage Vt of the temperature-sensitive resistor.

3. The pressure detection apparatus as claimed in claim 1, wherein:
the pressure signal generation output section has an amplification section which amplifies the difference voltage (Vp-Vt) and outputs the first voltage signal Spp; and
an amplification factor adjustment section which controls an amplification factor of the amplification section on the basis of the second voltage Vt of the temperature-sensitive resistor, and performs temperature characteristic compensation, which reduced deviation of the difference voltage (Vp-Vt) caused by a difference of the temperature T.

4. The pressure detection apparatus as claimed in claim 1, further comprising:
a plate-shaped Si device which has a first main surface and a second main surface that is parallel to the first main surface;
a supporting member which is contiguous with the second main surface of the Si device and supports the Si device; and
a pressing member which is contiguous with the first main surface of the Si device and compresses the Si device between the supporting member and the pressing member by pressing the first main surface by a pressing force according to the pressure P, and wherein:
the pressure-sensitive resistor and the temperature-sensitive resistor are formed on the first main surface of the Si device,
the second resistance r2 of the temperature sensitive resistor varies mainly according to the temperature T, and
a variation of the second resistance r2 occurring according to a change of the pressure P is one-tenth (1/10) or less of a variation pf the first resistance r1 occurring according to the change of the pressure P.

5. The pressure detection apparatus as claimed in claim 4, wherein:
the first main surface of the Si device has
a contact area which the pressing member touches; and
a noncontact area which the pressing member does not touch,
surface orientation of the first main surface is {110} plane, and wherein
the pressure-sensitive resistor is formed mainly from pressure-sensitive sections which extend in <110> direction of the Si device, and placed in the contact area of the first main surface, and
the temperature-sensitive resistor is formed mainly from temperature-sensitive sections which extend in <100> direction of the Si device, and placed in the noncontact area of the first main surface.

6. The pressure detection apparatus as claimed in claim 4, wherein:
the pressure-sensitive resistor and the temperature-sensitive resistor are formed simultaneously through a same diffusion process.

7. The pressure detection apparatus as claimed in claim 4, wherein:
the pressure-sensitive resistor and the temperature-sensitive resistor are p-type semiconductors, and its impurity concentration Cp (1/cm$^3$) is either one of $0.6\times10^{18} \leq Cp \leq 1.4\times10^{18}$ or $0.6\times10^{20} \leq Cp \leq 1.4\times10^{20}$.

8. The pressure detection apparatus as claimed in claim 4, wherein:
the Si device has the following terminal pads on the first main surface;
a first terminal pad that is a connection point connecting the one end of the pressure-sensitive resistor and the first constant-current source:
a second terminal pad that is a connection point connection the one end of the temperature-sensitive resistor and the second constant-current source; and
a third terminal pad that is a common pad connecting the other end of the pressure-sensitive resistor and the other end of the temperature-sensitive resistor.

9. The pressure detection apparatus as claimed in claim 4, wherein:
the Si device is an SOI substrate.

10. The pressure detection apparatus as claimed in claim 4, wherein:
the pressure detection apparatus is configured so that the pressure detection apparatus can be secured to an internal combustion engine and the pressing force of the first main surface from the pressing member varies according to a change of a cylinder internal pressure of the internal combustion engine.

11. The pressure detection apparatus of claim 1, wherein the pressure detection apparatus is compression type.

12. The pressure detection apparatus of claim 11, wherein the pressure is detected using only the compressive stress from the pressure P.

* * * * *